(12) United States Patent
Chi et al.

(10) Patent No.: US 12,742,974 B2
(45) Date of Patent: Sep. 22, 2026

(54) LIGHT GUIDE ILLUMINATION ASSEMBLY FOR PROVIDING INCREASED CONTRAST

(71) Applicant: Meta Platforms Technologies, LLC, Menlo Park, CA (US)

(72) Inventors: Wanli Chi, Sammamish, WA (US); Sihui He, Sunnyvale, CA (US); Ying Geng, Bellevue, WA (US); Maxwell Parsons, Seattle, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 618 days.

(21) Appl. No.: 18/154,038

(22) Filed: Jan. 12, 2023

(65) Prior Publication Data

US 2023/0258950 A1 Aug. 17, 2023

Related U.S. Application Data

(60) Provisional application No. 63/310,574, filed on Feb. 15, 2022.

(51) Int. Cl.
*G02B 27/00* (2006.01)
*G02B 27/09* (2006.01)
(Continued)

(52) U.S. Cl.
CPC ..... *G02B 27/0938* (2013.01); *G02B 27/0093* (2013.01); *G02B 6/0016* (2013.01); *G02B 27/017* (2013.01); *G02B 2027/0178* (2013.01)

(58) Field of Classification Search
CPC ................ G02B 27/01; G02B 27/0101; G02B 27/0103; G02B 27/017; G02B 27/0172;
(Continued)

(56) References Cited

U.S. PATENT DOCUMENTS

2002/0003508 A1* 1/2002 Schehrer ............ G02B 27/0172 345/7
2019/0086674 A1* 3/2019 Sinay ...................... G06F 3/013
(Continued)

OTHER PUBLICATIONS

International Preliminary Report on Patentability for International Application No. PCT/US2023/013087, mailed Aug. 29, 2024, 10 pages.

(Continued)

*Primary Examiner* — Marin Pichler
(74) *Attorney, Agent, or Firm* — Greenberg Traurig, LLP

(57) ABSTRACT

A device includes a light source configured to output a first beam, and a light guide coupled with an in-coupling element and an out-coupling element. The device includes a display panel and a lens assembly disposed at opposite sides of the light guide. The in-coupling element is configured to couple the first beam into the light guide as a second beam. The out-coupling element is configured to couple a first portion of the second beam out of the light guide as a third beam propagating toward the display panel to illuminate the display panel, and couple a second portion of the second beam out of the light guide as a fourth beam propagating toward the lens assembly. A normal of a surface of the light guide where the out-coupling element is disposed is tilted by a predetermined angle with respect to an axis of the display panel.

9 Claims, 11 Drawing Sheets

(51) Int. Cl.
*F21V 8/00* (2006.01)
*G02B 27/01* (2006.01)

(58) Field of Classification Search
CPC ........ G02B 27/0179; G02B 2027/0118; G02B 2027/012; G02B 2027/0174; G02B 2027/0178; G02B 6/0015; G02B 6/0016; G02B 6/0023; G02B 6/0028; G02B 6/0033; G02B 6/0035; G02B 6/0036; G02B 6/0045; G02B 6/0046; G02B 6/0048; G02B 6/005; G02B 6/0053; G02B 6/0055
See application file for complete search history.

(56) References Cited

U.S. PATENT DOCUMENTS

| | | | | |
|---|---|---|---|---|
| 2020/0301239 | A1 | 9/2020 | Akkaya et al. | |
| 2020/0371280 | A1* | 11/2020 | Geng | G02B 27/0093 |
| 2020/0371388 | A1 | 11/2020 | Geng et al. | |

OTHER PUBLICATIONS

International Search Report and Written Opinion for International Application No. PCT/US2023/013087, mailed Jul. 24, 2023, 11 pages.

Co-pending U.S. Appl. No. 17/519,391, inventors Amirsolaimani; Babak et al., filed Nov. 4, 2021.

Co-pending U.S. Appl. No. 17/549,394, inventors Parsons; Max et al., filed Dec. 13, 2021.

* cited by examiner

LIGHT GUIDE ILLUMINATION ASSEMBLY FOR PROVIDING INCREASED CONTRAST

CROSS REFERENCE TO RELATED APPLICATION

This application claims the benefit of priority to U.S. Provisional Application No. 63/310,574, filed on Feb. 15, 2022. The content of the above-mentioned application is incorporated herein by reference in its entirety.

TECHNICAL FIELD

The present disclosure relates generally to optical devices and, more specifically, to a light guide illumination assembly for providing an increased contrast.

BACKGROUND

An artificial reality system, such as a head-mounted display ("HMD") or heads-up display ("HUD") system, generally includes a near-eye display ("NED") system in the form of a headset or a pair of glasses, which is configured to present content to a user via an electronic or optic display within a distance, for example, of about 10-20 mm in front of the eyes of a user. The NED system may display virtual objects or combine images of real objects with virtual objects, as in augmented reality ("AR"), virtual reality ("VR"), and/or mixed reality ("MR") applications. VR, AR, and MR head-mounted displays have wide applications in various fields, including engineering design, medical surgery practice, and video gaming. For example, a user can wear a VR head-mounted display integrated with audio headphones while playing video games so that the user can have an interactive experience in an immersive virtual environment.

SUMMARY OF THE DISCLOSURE

Consistent with an aspect of the present disclosure, a device is provided. The device includes a light source configured to output a first beam. The device also includes a light guide coupled with an in-coupling element and an out-coupling element. The device also includes a display panel and a lens assembly disposed at opposite sides of the light guide. The in-coupling element is configured to couple the first beam into the light guide as a second beam. The out-coupling element is configured to couple a first portion of the second beam out of the light guide as a third beam propagating toward the display panel to illuminate the display panel, and couple a second portion of the second beam out of the light guide as a fourth beam propagating toward the lens assembly. A normal of a surface of the light guide where the out-coupling element is disposed is tilted by a predetermined angle with respect to an axis of the display panel.

Consistent with another aspect of the present disclosure, a device is provided. The device includes a light source configured to output a first beam. The device also includes a light guide coupled with an in-coupling element and an out-coupling element. The device also includes a display panel and a lens assembly disposed at opposite sides of the light guide. The device also includes a beam deflecting element disposed between the light guide and the display panel. The in-coupling element is configured to couple the first beam into the light guide as a second beam. The out-coupling element is configured to couple a first portion of the second beam out of the light guide as a third beam propagating toward the beam deflecting element, and couple a second portion of the second beam out of the light guide as a fourth beam propagating toward the lens assembly. The beam deflecting element is configured to forwardly deflect the third beam as a fifth beam propagating toward the display panel to illuminate the display panel.

Other aspects of the present disclosure can be understood by those skilled in the art in beam of the description, the claims, and the drawings of the present disclosure. The foregoing general description and the following detailed description are exemplary and explanatory only and are not restrictive of the claims.

BRIEF DESCRIPTION OF THE DRAWINGS

The following drawings are provided for illustrative purposes according to various disclosed embodiments and are not intended to limit the scope of the present disclosure. In the drawings.

DETAILED DESCRIPTION

Figure 1A:
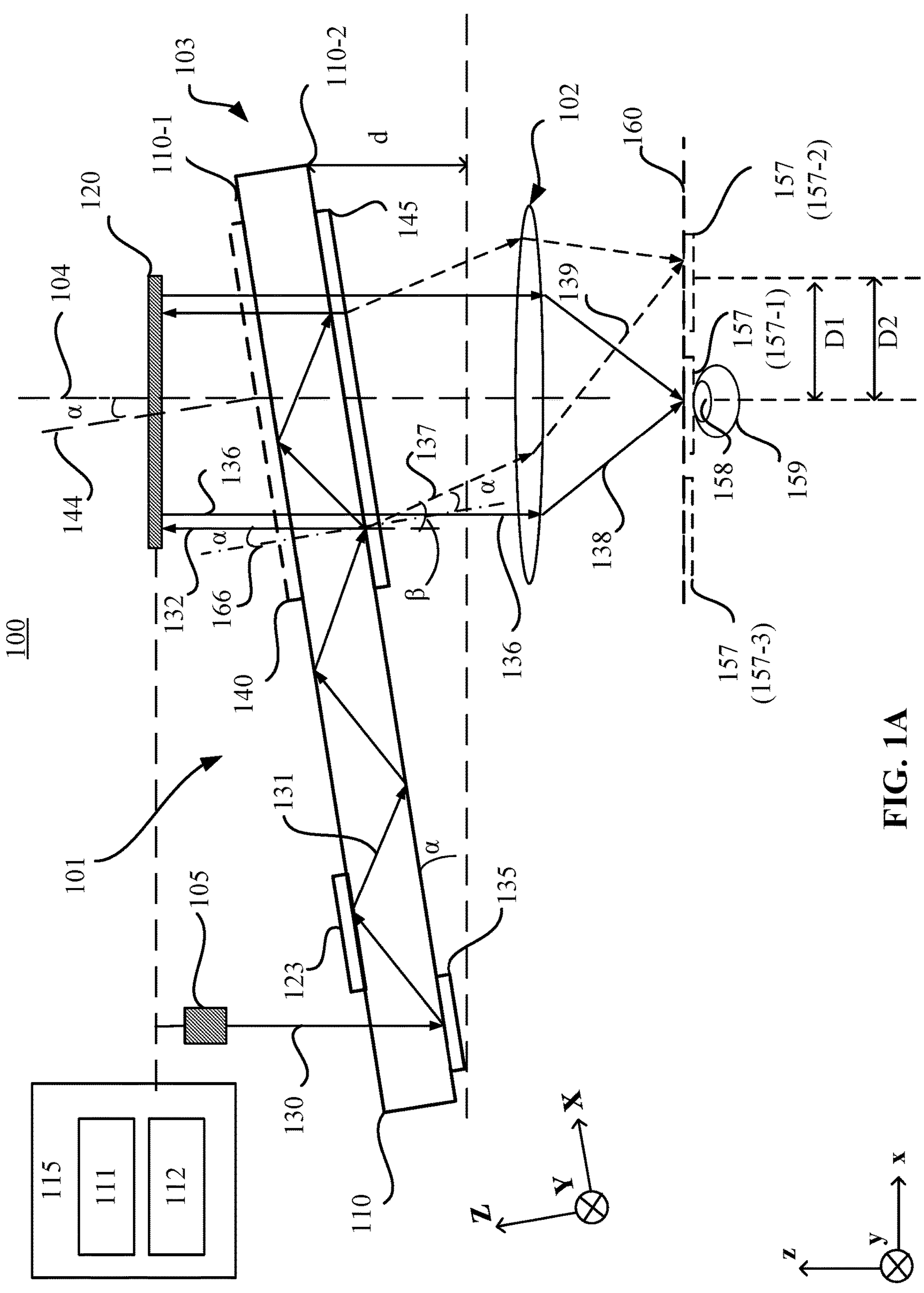
FIG. 1A schematically illustrates a diagram of a system including a light guide illumination assembly for providing an increased contrast, according to an embodiment of the present disclosure.

Embodiments consistent with the present disclosure will be described with reference to the accompanying drawings, which are merely examples for illustrative purposes and are not intended to limit the scope of the present disclosure. Wherever possible, the same reference numbers are used throughout the drawings to refer to the same or similar parts, and a detailed description thereof may be omitted.

Further, in the present disclosure, the disclosed embodiments and the features of the disclosed embodiments may be combined. The described embodiments are some but not all of the embodiments of the present disclosure. Based on the disclosed embodiments, persons of ordinary skill in the art may derive other embodiments consistent with the present disclosure. For example, modifications, adaptations, substitutions, additions, or other variations may be made based on the disclosed embodiments. Such variations of the disclosed embodiments are still within the scope of the present disclosure. Accordingly, the present disclosure is not limited to the disclosed embodiments. Instead, the scope of the present disclosure is defined by the appended claims.

As used herein, the terms "couple," "coupled," "coupling," or the like may encompass an optical coupling, a mechanical coupling, an electrical coupling, an electromagnetic coupling, or any combination thereof. An "optical coupling" between two optical elements refers to a configuration in which the two optical elements are arranged in an optical series, and a beam output from one optical element may be directly or indirectly received by the other optical element. An optical series refers to optical positioning of a plurality of optical elements in a beam path, such that a beam output from one optical element may be transmitted, reflected, diffracted, converted, modified, or otherwise processed or manipulated by one or more of other optical elements. In some embodiments, the sequence in which the plurality of optical elements are arranged may or may not affect an overall output of the plurality of optical elements. A coupling may be a direct coupling or an indirect coupling (e.g., coupling through an intermediate element).

The phrase "at least one of A or B" may encompass all combinations of A and B, such as A only, B only, or A and B. Likewise, the phrase "at least one of A, B, or C" may encompass all combinations of A, B, and C, such as A only, B only, C only, A and B, A and C, B and C, or A and B and C. The phrase "A and/or B" may be interpreted in a manner similar to that of the phrase "at least one of A or B." For example, the phrase "A and/or B" may encompass all combinations of A and B, such as A only, B only, or A and B. Likewise, the phrase "A, B, and/or C" has a meaning similar to that of the phrase "at least one of A, B, or C." For example, the phrase "A, B, and/or C" may encompass all combinations of A, B, and C, such as A only, B only, C only, A and B, A and C, B and C, or A and B and C.

When a first element is described as "attached," "provided," "formed," "affixed," "mounted," "secured," "connected," "bonded," "recorded," or "disposed," to, on, at, or at least partially in a second element, the first element may be "attached," "provided," "formed," "affixed," "mounted," "secured," "connected," "bonded," "recorded," or "disposed," to, on, at, or at least partially in the second element using any suitable mechanical or non-mechanical manner, such as depositing, coating, etching, bonding, gluing, screwing, press-fitting, snap-fitting, clamping, etc. In addition, the first element may be in direct contact with the second element, or there may be an intermediate element between the first element and the second element. The first element may be disposed at any suitable side of the second element, such as left, right, front, back, top, or bottom.

When the first element is shown or described as being disposed or arranged "on" the second element, term "on" is merely used to indicate an example relative orientation between the first element and the second element. The description may be based on a reference coordinate system shown in a figure, or may be based on a current view or example configuration shown in a figure. For example, when a view shown in a figure is described, the first element may be described as being disposed "on" the second element. It is understood that the term "on" may not necessarily imply that the first element is over the second element in the vertical, gravitational direction. For example, when the assembly of the first element and the second element is turned 180 degrees, the first element may be "under" the second element (or the second element may be "on" the first element). Thus, it is understood that when a figure shows that the first element is "on" the second element, the configuration is merely an illustrative example. The first element may be disposed or arranged at any suitable orientation relative to the second element (e.g., over or above the second element, below or under the second element, left to the second element, right to the second element, behind the second element, in front of the second element, etc.).

When the first element is described as being disposed "on" the second element, the first element may be directly or indirectly disposed on the second element. The first element being directly disposed on the second element indicates that no additional element is disposed between the first element and the second element. The first element being indirectly disposed on the second element indicates that one or more additional elements are disposed between the first element and the second element.

The term "processor" used herein may encompass any suitable processor, such as a central processing unit ("CPU"), a graphics processing unit ("GPU"), an application-specific integrated circuit ("ASIC"), a programmable logic device ("PLD"), or any combination thereof. Other processors not listed above may also be used. A processor may be implemented as software, hardware, firmware, or any combination thereof.

The term "controller" may encompass any suitable electrical circuit, software, or processor configured to generate a control signal for controlling a device, a circuit, an optical element, etc. A "controller" may be implemented as software, hardware, firmware, or any combination thereof. For example, a controller may include a processor, or may be included as a part of a processor.

The term "non-transitory computer-readable medium" may encompass any suitable medium for storing, transferring, communicating, broadcasting, or transmitting data, signal, or information. For example, the non-transitory computer-readable medium may include a memory, a hard disk, a magnetic disk, an optical disk, a tape, etc. The memory may include a read-only memory ("ROM"), a random-access memory ("RAM"), a flash memory, etc.

The term "film," "layer," "coating," or "plate" may include rigid or flexible, self-supporting or free-standing film, layer, coating, or plate, which may be disposed on a supporting substrate or between substrates. The terms "film," "layer," "coating," and "plate" may be interchangeable. The term "film plane" refers to a plane in the film, layer, coating, or plate that is perpendicular to the thickness direction. The film plane may be a plane in the volume of the film, layer, coating, or plate, or may be a surface plane of the film, layer, coating, or plate. The term "in-plane" as in, e.g., "in-plane orientation," "in-plane direction," "in-plane pitch," etc., means that the orientation, direction, or pitch is within the film plane. The term "out-of-plane" as in, e.g., "out-of-plane direction," "out-of-plane orientation," or "out-of-plane pitch" etc., means that the orientation, direction, or pitch is not within a film plane (i.e., non-parallel with a film plane). For example, the direction, orientation, or pitch may be along a line that is perpendicular to a film plane, or that forms an acute or obtuse angle with respect to the film plane.

For example, an "in-plane" direction or orientation may refer to a direction or orientation within a surface plane, an "out-of-plane" direction or orientation may refer to a thickness direction or orientation non-parallel with (e.g., perpendicular to) the surface plane.

The term "orthogonal" as in "orthogonal polarizations" or the term "orthogonally" as in "orthogonally polarized" means that an inner product of two vectors representing the two polarizations is substantially zero. For example, two beams or beams with orthogonal polarizations (or two orthogonally polarized beams or beams) may be two linearly polarized beams (or beams) with two orthogonal polarization directions (e.g., an x-axis direction and a y-axis direction in a Cartesian coordinate system) or two circularly polarized beams with opposite handednesses (e.g., a left-handed circularly polarized beam and a right-handed circularly polarized beam).

The wavelength ranges, spectra, or bands mentioned in the present disclosure are for illustrative purposes. The disclosed optical device, system, element, assembly, and method may be applied to a visible wavelength band, as well as other wavelength bands, such as an ultraviolet ("UV") wavelength band, an infrared ("IR") wavelength band, or a combination thereof. The term "substantially" or "primarily" used to modify an optical response action, such as transmit, reflect, diffract, block or the like that describes processing of a beam means that a major portion, including all, of a beam is transmitted, reflected, diffracted, or blocked, etc. The major portion may be a predetermined percentage (greater than 50%) of the entire beam, such as 100%, 98%, 90%, 85%, 80%, etc., which may be determined based on specific application needs.

The term "optic axis" may refer to a direction in a crystal. A beam propagating in the optic axis direction may not experience birefringence (or double refraction). An optic axis may be a direction rather than a single line: beams that are parallel to that direction may experience no birefringence.

An angle formed by a ray (or beam) with respect to a reference axis may be defined as positive or negative depending on the angular relationship between the ray (or a beam) and the reference axis. For discussion purposes, the angle formed by the ray (or beam) with respect to the reference axis may be defined as positive when the ray (or beam) is clockwise from the reference axis, and as negative when the ray (or beam) is counter-clockwise from the reference axis. For example, an output angle of a ray (or beam) coupled out from an out-coupling element may be defined as an angle between the ray (or a beam, or a light) and a normal of a surface of the out-coupling element or a normal of a surface of a light guide coupled with the out-coupling element. The output angle may be defined as positive when the ray (or a beam, or a light) is clockwise from the surface normal, and as negative when the ray (or a beam, or a light) is counter-clockwise from the surface normal.

Figure 6:
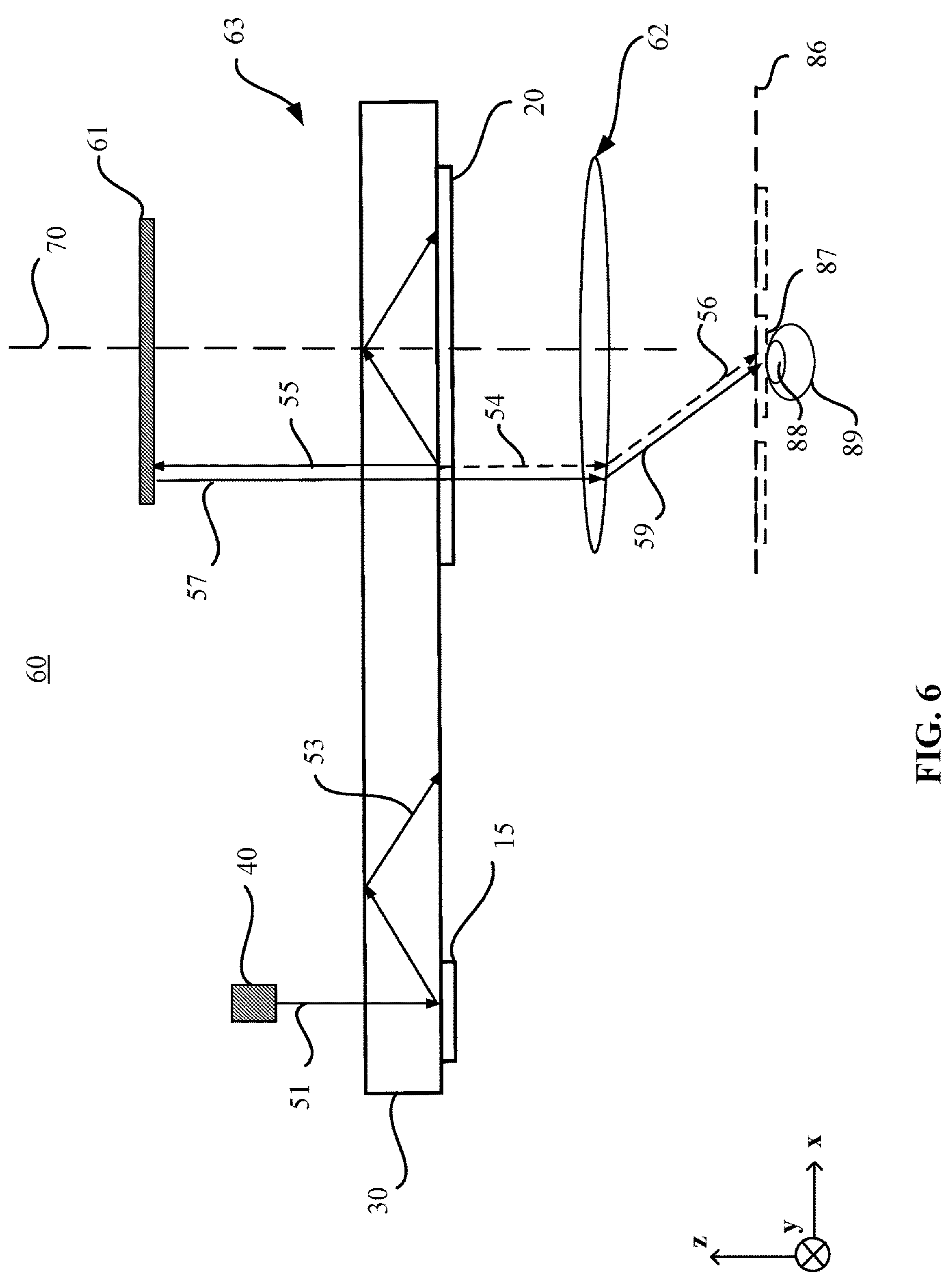
FIG. 6 schematically illustrates a diagram of a conventional NED including a conventional light guide illumination assembly.

FIG. 6 schematically illustrates a diagram of a conventional near-eye display ("NED") 60. As shown in FIG. 6, the NED 60 may include a light guide illumination assembly 63, a display panel 61, and a lens assembly 62. The light guide illumination assembly 63 may include a light source assembly 40, and a light guide 30 coupled with an in-coupling element 15 and an out-coupling element 20. The display panel 61 and the lens assembly 62 may be disposed at opposite sides of the light guide 30. The display panel 61 and the lens assembly 62 may be arranged in parallel, and may be aligned perpendicular to a same axis 70. The axis 70 may be an optical axis of the lens assembly 62, or an axis of symmetry of the display panel 61. The light guide 30 may be arranged in parallel with the display panel 61 and the lens assembly 62, with the surface normal of the light guide 30 being parallel with the axis 70. The light source assembly 40 may output a beam 51 toward the light guide 30.

The beam 51 may be guided by the light guide 30 to the display panel 61 for illuminating the display panel 61. The in-coupling element 15 may couple the beam 51 into the light guide 30 as an in-coupled beam 53 that prorogates along the light guide 30 toward the out-coupling element 20 via total internal reflection ("TIR"). The out-coupling element 20 may couple a first portion (a major portion) of the in-coupled beam 53 out of the light guide 30 as a beam 55 (a signal beam 55) propagating toward the display panel 61 to illuminate the display panel 61, and couple a second portion (a minor portion) of the in-coupled beam 53 out of the light guide 30 as a beam 54 propagating toward the lens assembly 62. In some embodiments, the minor portion may be equal to or less than 10% of the major portion. The beam 54 may be referred to as a leaked beam 54, which leaks out of the out-coupling element 20. That is, out-coupling the leaked beam 54 is not a design specification of the out-coupling element 20, and is an undesirable optical effect that may cause adverse effect on the image quality of the NED 60. The propagation directions of the signal beam 55 and the leaked beam 54 may be opposite directions along the same axis 70. For example, as shown in FIG. 6, the signal beam 55 may propagate along the +z-axis, and the leaked beam 54 may propagate along the −z-axis.

The signal beam 55 may be normally incident onto the display panel 61. The display panel 61 may modulate and reflect the signal beam 55 as an image beam 57 that represents a virtual image generated by the display panel 61. The image beam 57 may propagate along the −z-axis toward the lens assembly 62. Thus, the propagation directions of the leaked beam 54 and the image beam 57 may be substantially the same. The lens assembly 62 may focus the leaked beam 54 and the image beam 57 to a substantially same location (e.g., a same exit pupil 87) in an eye-box region 86 of the NED 60. The exit pupil 87 may be a spatial location in the eye-box region 86 where an eye pupil 88 of an eye 89 of a user of the NED 60 may be positioned to receive the content of the virtual image generated by the display panel 61. As shown in FIG. 6, the lens assembly 62 may focus the leaked beam 54 and the image beam 57 as a leaked beam 56 and an image beam 59 that propagate through the same exit pupil 87, respectively. Thus, the eye 89 located at the exit pupil 87 may perceive both of the leaked beam 56 and the image beam 59. The image beam 59 may represent the virtual image displayed on the display panel 61. As the leaked beam 54 (and the leaked beam 56) is not modulated by the display panel 61, the leaked beam 54 (and the leaked beam 56) may degrade the contrast ratio of the virtual image perceived by the eye 89.

In view of the limitations in the conventional technologies, the present disclosure provides a system configured to steer the leaked beam out of the eye pupil, thereby providing an increased contrast ratio of virtual images at an eye-box region of the system. The disclosed system may be implemented in various devices or systems, e.g., head-up displays ("HUDs"), head-mounted displays ("HMDs"), near-eye displays ("NEDs"), smart phones, laptops, televisions, vehicles, etc., to enhance the user experience. FIG. 1A schematically illustrates an x-z sectional view of a system 100 configured to provide an increased contrast, according to an embodiment of the present disclosure. The system 100 may also be referred to as a light guide display system 100. As shown in FIG. 1A, the system 100 may include a display assembly 101, a viewing optics assembly 102, and a controller 115. The display assembly 101 may be configured to output an image beam representing a virtual image generated by the display assembly 101. The display assembly 101 may include a light source assembly 105, a light guide 110, and a display element (e.g., display panel) 120. The light source assembly 105 may be configured to output a beam 130 for illuminating the display panel 120 toward the light guide 110. The light guide 110 may be coupled with an in-coupling element 135 and an out-coupling element 145 to guide the beam 130 to illuminate the display panel 120. For example, the light guide 110 coupled with the in-coupling element 135 and the out-coupling element 145 may receive the beam 130, guide the beam 130 to propagate along the light guide 110 through total internal reflection as a beam 131 (also referred to as an in-coupled beam 131), and output the beam 131 as a plurality of output beams 132 propagating toward the display panel 120. In some embodiments, the output beams 132 may be normally incident onto the display panel 120. In some embodiments, the propagation direction of the output beams 132 may be parallel with the propagation direction of the beam 130.

The display panel 120 may include a suitable non-emissive, reflective display panel (also referred to as 120 for discussion purposes), such as a reflective liquid crystal on silicon ("LCOS") display panel, or a digital beam processing ("DLP") display panel, etc. For example, a typical DLP display panel may have an incident angle of 24 degrees and an output angle of 0 degree. This makes the light leakage have a typical 24 degree angle offset from a signal beam. The disclosed system can improve contrast for the DLP display panel. The display panel 120 may include a reflective pixel array facing a light output portion of the light guide 110. The display panel 120 may be illuminated by the output beams 132, and may modulate and reflect the output beams 132 into the image beam that represents the virtual image generated by the display panel 120. For example, respective points (e.g., respective pixels) of the display panel 120 may modulate and reflect the respective output beams 132 incident thereonto as respective image lights 136 (e.g., divergent image lights) toward the viewing optics assembly 102. For illustrative purposes, FIG. 1A shows a single ray of the image light 136 output from a point at the left half of the display panel 120, and a single ray of the image light 136 output from a point at the right half of the display panel 120. For illustrative purposes, the two rays are shown as being normally output from the display panel 120 (i.e., perpendicular to a light outputting surface of the display panel 120). A combination of the respective image lights 136 may form the image beam that represents the entire virtual image generated by the display panel 120. For discussion purposes, the image beam that represents the entire virtual image generated by the display panel 120 may be collectively referred to as the image beam 136.

The viewing optics assembly 102 may be arranged between the display assembly 110 and an eye 159 of a user. The viewing optics assembly 102 may include a suitable lens assembly (also referred to 102 for discussion purposes) configured to convert the image beam 136 into an image beam that propagates through one or more exit pupils 157 in an eye-box region 160 of the system 100. For example, the lens assembly 102 may convert the respective image beams 136 into respective image beams 138 (e.g., collimated image beams) that propagate through one or more exit pupils 157. A combination of the respective image lights 138 may form the image beam that propagates through one or more exit pupils 157. For discussion purposes, the image beam that propagates through one or more exit pupils 157 may be collectively referred to as the image beam 138. The exit pupil 157 may be a spatial location in the eye-box region 160 where an eye pupil 158 of the eye 159 may be positioned to receive the content of the virtual image generated by the display assembly 101. Thus, the eye 159 located at the exit pupil 157 may perceive the entire virtual image generated by the display panel 120.

In some embodiments, the exit pupils 157 may be arranged in a one-dimensional ("1D") or a two-dimensional ("2D") array within the eye-box region 160. The size of a single exit pupil 157 may be larger than and comparable with the size of the eye pupil 158. The exit pupils 157 may be sufficiently spaced apart, such that when one of the exit pupils 157 substantially coincides with the position of the eye pupil 158, the remaining one or more exit pupils 157 may be located outside of the eye pupil 158 (e.g., falling outside of the area of the eye pupil 158).

The controller 115 may be communicatively coupled with the light source assembly 105 and the display panel 120. The controller 115 may include a processor or processing unit 111. The controller 115 may include a storage device 112. The storage device 112 may be a non-transitory computer-readable medium, such as a memory, a hard disk, etc., for storing data, information, and/or computer-executable program instructions or codes.

In the display assembly 101, the light source assembly 105 may be configured to include a light source configured to output a beam (not shown), and one or more optical elements (not shown) configured to condition the beam output from the light source. The conditioned beam may be output from the light source assembly 105 as the beam 130 propagating toward the light guide 110. The light source may include a laser diode, or two or more laser diodes configured to output lights of different colors, e.g. red, green, blue. The beam 130 output from the light source assembly 105 may be configured with predetermined optical properties, such as a predetermined wavefront, a predetermined propagation direction, a predetermined polarization, a predetermined wavelength range, and/or a predetermined beam size, etc. The beam 130 may be referred to as an input beam of the light guide 110. The light guide 110 coupled with the in-coupling element 135 and the out-coupling element 145 may guide the input beam 130 to illuminate the display panel 120. For discussion purposes, the combination of the light source assembly 105 and the light guide 110 coupled with the in-coupling element 135 and the out-coupling element 145 may also be referred to as a light guide illumination assembly 103. The x-y-z coordinate system shown in FIG. 1A refers to a global coordinate system for the system 100, whereas an X-Y-Z coordinate system shown in FIG. 1A refers to a local coordinate system for the light guide illumination assembly 103.

The in-coupling element 135 may be disposed at a first portion (e.g., an input portion) of the light guide 110, and the out-coupling element 145 may be disposed at a second portion (e.g., an output portion) of the light guide 110. In some embodiments, each of the in-coupling element 135 and the out-coupling element 145 may be formed or disposed at (e.g., affixed to) a first surface 110-1 or a second surface 110-2 of the light guide 110. For illustrative purposes, the light guide 110 is presumed to have flat surfaces, with the first surface 110-1 being parallel with the second surface 110-2. In some embodiments, each of the in-coupling element 135 and the out-coupling element 145 may be integrally formed as a part of the light guide 110, or may be a separate element coupled to the light guide 110. In some embodiments, the in-coupling element 135 and/or the out-coupling element 145 may include one or more diffraction gratings, one or more cascaded reflectors, one or more prismatic surface elements, an array of holographic reflectors, or any combination thereof. The light guide 110 may include one or more materials configured to facilitate the total internal reflection ("TIR") of the in-coupled beam 131. The light guide 110 may include, for example, a plastic, a glass, and/or polymers. The light guide 110 may have a relatively small form factor.

The in-coupling element 135 may be configured to couple the input beam 130 into a TIR path inside the light guide 110 as the in-coupled beam 131. The in-coupled beam 131 may propagate inside the light guide 110 through TIR to the out-coupling element 145, and hence may also be referred to as a TIR propagating beam 131. In some embodiments, the out-coupling element 145 may consecutively couple the in-coupled beam 131 incident onto different portions of the out-coupling element 145 out of the light guide 110 at different positions along the light guide 110. For example, the out-coupling element 145 may couple the in-coupled beam 131 out of the light guide 110 as the plurality of output beams 132 propagating toward the display panel 120. Thus, the out-coupling element 145 may replicate the input beam 130 at the output side of the light guide 110, to expand an effective pupil of the light guide illumination assembly 103, e.g., in an X-axis direction in FIG. 1A. An active region of the display panel 120 may be illuminated by the plurality of output beams 132.

In some embodiments, the light guide illumination assembly 103 may include additional elements configured to redirect, fold, and/or expand the in-coupled beam 131. As shown in FIG. 1A, one or more redirecting/folding elements 140 may be coupled to the light guide 110 to redirect the in-coupled beam 131 propagating inside the light guide 110. The redirecting element 140 may be separately formed and disposed at (e.g., affixed to) the first surface 110-1 or the second surface 110-2, or may be integrally formed as a part of the light guide 110. The redirecting element 140 and the out-coupling element 145 may be disposed at a same surface or at different surfaces of the light guide 110. The redirecting element 140 and the out-coupling element 145 may at least partially overlap with one another in the X-axis direction, as shown in FIG. 1A. In some embodiments, the redirecting element 140 may not overlap with the out-coupling element 145 in the X-axis direction. In some embodiments, the out-coupling element 145 and the redirecting element 140 together may provide a two-dimensional ("2D") expansion of the input beam 130 at the output side of the light guide 110. For example, the out-coupling element 145 may couple the in-coupled beam 131 out of the light guide 110 to replicate the input beam 130 in a first direction (e.g., the X-axis direction in FIG. 1A). The redirecting element 140 may be configured to expand the in-coupled beam 131 in a second direction (e.g., the Y-axis direction in FIG. 1A), and redirect the expanded in-coupled beam 131 to the out-coupling element 145. The out-coupling element 145 may couple the in-coupled beam 131 out of the light guide 110, and replicate the input beam 130 in the second direction (e.g., the Y-axis direction in FIG. 1A). In some embodiments, multiple functions, e.g., out-coupling, redirecting, folding, and/or expanding the input beam 130 may be combined into a single element, e.g. the out-coupling element 145, and hence, the redirecting element 140 may be omitted. For example, the out-coupling element 145 may be configured to provide a 2D expansion of the input beam 130 at the output side of the light guide 110.

Although the light guide 110, the in-coupling element 135, the redirecting element 140, and the out-coupling element 145 are shown as having flat surfaces for illustrative purposes, any of these elements may include one or more curved surfaces or may have curved shapes. In some embodiments, the light guide display system 100 may include a plurality of light guides 110 disposed in a stacked configuration (not shown in FIG. 1A). At least one (e.g., each) of the plurality of light guides 110 may be coupled with an in-coupling element, an out-coupling element, and in some embodiments, a redirecting or folding element. In some embodiments, the plurality of light guides 110 in the stacked configuration may be configured to output a polychromatic beam (e.g., a full-color beam including components of multiple colors) to illuminate the display panel 120.

For discussion purposes, in the following descriptions, the light guide illumination assembly 103 is presumed to include the in-coupling element 135 and the out-coupling element 145 without the redirecting element 140. In some embodiments, when the in-coupled beam 131 is incident onto the out-coupling element 145, the out-coupling element 145 may couple a first portion (e.g., a major portion) of the in-coupled beam 131 out of the light guide 110 as the plurality of output beams 132 propagating toward the display panel 120, and couple a second portion (e.g., a minor portion) of the in-coupled beam 131 out of the light guide 110 as a plurality of output beams 137 propagating toward the lens assembly 102 directly. The output beams 132 propagating from the out-coupling element 145 to the display panel 120 may be referred to as signal beams 132, and the output beams 137 propagating from the out-coupling element 145 to the lens assembly 102 (and hence toward the eye-box region 160) may be referred to as leaked beams 137.

For discussion purposes, FIG. 1A shows two signal beams 132 propagating toward the display panel 120 and two leaked beams 137 propagating toward the lens assembly 102 directly. As the leaked beam 137 is directly incident onto the lens assembly 102 without being modulated by the display panel 120, the leaked beam 137 may not include the content of the virtual image output from the display panel 120. The leaked beam 137 may also be focused by the lens assembly 102 to one or more exit pupils 157 at the eye-box region 160. If the eye 159 receives both of the leaked beam 137 and the image beam 136 (which is the output of the display panel 120 based on the signal beam 132), the contrast ratio of the virtual image perceived by the eye 159 may be reduced.

In the embodiment shown in FIG. 1A, to mitigate the adverse optical effect caused by the leaked beam 137 on the contrast ratio of the virtual image (i.e., to mitigate the reduction in the contrast ratio caused by the leaked beam 137), the light guide 110 may be tilted. For example, the light guide 110 may be tilted with respect to the lens assembly 102 or the display panel 120, by an angle (absolute value $\alpha$). In other words, the light guide 110 is non-parallel with the display panel 120 and an image plane of the lens assembly 102, or the light guide 110 is not perpendicular to the axis 104. A surface normal 144 of the light guide 110 may be tilted by an angle (absolute value $\alpha$) with respect to the axis 104 of the display panel 120 or the lens assembly 102. As shown in FIG. 1A, the display panel 120 and the lens assembly 102 may be arranged in parallel, and may be aligned perpendicular to the same axis 104. The axis 104 may be an optical axis of the lens assembly 102, or an axis of symmetry of the display panel 120 along a thickness direction of the display panel 120. The light guide 110 may be arranged to be unparallel with the display panel 120 and the lens assembly 102, with the surface normal 144 forming a tilt angle (absolute value α) with respect to the axis 104. The surface 110-1 or 110-2 of the light guide 110 may form an angle of (90°−α) with respect to the axis 104. When the light guide 110 is tilted by a, the beam 130 output from the light source assembly 105 may be incident onto the in-coupling element 135 at an incidence angle (absolute value α) with respect to a surface normal of the in-coupling element 135.

The out-coupling element 145 may couple a first portion of the in-coupled beam 131 out of the light guide 110 as the output beam 132 having an output angle with an absolute value α with respect to a surface normal 166 of the out-coupling element 145 (or the light guide 110). The output beam 132 may be output toward the display panel 120 located at a first side of the out-coupling element 145 or the light guide 110. The output beam 132 may be modulated and reflected by the display panel 120 as the image beam 136, which is parallel with the output beam 132. The image beam 136 may propagate through the light guide 110 and the out-coupling element 145 (and the redirecting element 140, if included), without changing the propagation direction.

The out-coupling element 145 may couple a second portion of the in-coupled beam 131 to a second side of the out-coupling element 145 out of the light guide 110 as the leaked beam 137 having an output angle with an absolute value α with respect to the surface normal 166 of the out-coupling element 145 (or the light guide 110). The output angles of the output beam 132 (a signal beam) and the leaked beam 137 may have the same absolute value and opposite signs, one being positive and the other being negative defined with respect to the surface normal 166 of the out-coupling element 145. The leaked beam 137 may form an angle (absolute value β) with respect to the image beam 136 (note that the image beam 136 substantially coincides with the backward extension of the output beam 132, although in FIG. 1A, the image beam 136 is shown as spaced apart from the image beam 132 with a gap), or with respect to the axis 104.

In some embodiments, the absolute value (β) of the angle between the image beam 136 and the leaked beam 137 may be two times of the absolute value (a) of the tilt angle, i.e., β=2*α. The leaked beam 137 may be output toward the lens assembly 102 located at a second side of the out-coupling element 145 or the light guide 110. As shown in FIG. 1A, the first side and the second side of the out-coupling element 145 (or the light guide 110) are opposite sides. The output beam 132 and the leaked beam 137 may not propagate along a same axis. That is, the propagation directions of the output beam 132 and the leaked beam 137 may not be parallel with one another. The propagation directions of the output beam 132 and the leaked beam 137 may form an angle that is greater than 0° and less than 180°.

The tilt angle (absolute value α) of the light guide 110 may be configured, such that an angular separation (an angle with absolute value β) formed between the image beam 136 and the leaked beam 137 may be greater than or equal to a predetermined angle. In some embodiments, the value α of the tilt angle may be within a range from about 5° to 8°, a range from about 5° to 10°, a range from about 5° to 15°, a range from about 10° to 15°, a range from about 5° to 20°, a range from about 10° to 20°, or a range from about 15° to 20°, etc. Thus, the value β of the angle between the image beam 136 and the leaked beam 137 may be within a range from about 10° to 16°, a range from about 10° to 20°, a range from about 10° to 30°, a range from about 20° to 30°, a range from about 10° to 40°, a range from about 20° to 40°, or a range from about 30° to 40°, etc.

When the image beam 136 is focused by the lens assembly 102 as the image beam 138, and the leaked beam 137 is focused by the lens assembly 102 as a leaked beam 139, the image beam 138 may propagate through a first exit pupil 157-1 where the eye pupil 158 is located, and the leaked beam 139 may propagate through a spatial location in the eye-box region 160 that is outside of the first exit pupil. For example, the spatial location in the eye-box region 160 where the leaked beam 139 propagates through may be a second exit pupil 157-2 that does not correspond to the position of the eye pupil 158. In other words, the image beam 138 and the leaked beam 139 may be focused by the lens assembly 102 to different, separate exit pupils such that the eye pupil 158 located at one exit pupil may receive the image beam 138 but not the leaked beam 139. Accordingly, the eye pupil 158 located at the first exit pupil may receive the image beam 136 that represents the virtual image generated by the display panel 120, and may not receive the leaked beam 139. As a result, the leaked beam 139 may not cause a reduction in the contrast ratio of the virtual image perceived by the eye 159, and the contrast ratio of the virtual image perceived by the eye 159 may be enhanced as compared to a conventional system.

As shown in FIG. 1A, the output beam 132 may be parallel with the axis 104, and the leaked beam 137 may form an angle (absolute value β) with respect to the axis 104. FIG. 1A shows that the image beam 138 propagates through the first exit pupil 157-1 that substantially coincides with the position of the eye pupil 158, and the leaked beam 139 propagates through the second exit pupil 157-2 that is adjacent to the first exit pupil 157-1 and located outside of the eye pupil 158. For discussion purposes, the first exit pupil 157-1 through which the image beam 138 propagates may be referred to as an output exit pupil, and the exit pupil 157-2 through which the leaked beam 139 propagates may be referred to as a leakage exit pupil.

In some embodiments, a distance D2 between the output exit pupil (e.g., 157-1) and the leakage exit pupil (e.g., 157-2) in the eye-box region 160 may be configured to be greater than or equal to a distance D1 between two adjacent exit pupils 157 in the eye-box region 160. Thus, when the output exit pupil (e.g., 157-1) substantially coincides with the position of the eye pupil 158, the leakage exit pupil (e.g., 157-2) may be located beyond the position of the eye pupil 158 (e.g., falling outside of the eye pupil 158). Thus, the eye pupil 158 located at the output exit pupil 157-1 may receive the image beam 136 that represents the virtual image generated by the display panel 120, and may not receive the leaked beam 139. Accordingly, the leaked beam 139 may not cause a reduction in the contrast ratio in the virtual image perceived by the eye 159.

The positions of the output exit pupil (e.g., 157-1) and the leakage exit pupil (e.g., 157-2) shown in FIG. 1A are for illustrative purposes. In some embodiments, the output exit pupil and the leakage exit pupil may have other suitable positions. In some embodiments, the tilt angle (absolute value α) of the light guide 110 may be configured, such that the lens assembly 102 may focus the leaked beam 137 as the leaked beam 139 that propagates through an exit pupil (not shown) that is further away than the exit pupil 157-2 to the right of the exit pupil 157-1 where the eye pupil 158 is located. In some embodiments, when the position of the eye pupil 158 is changed to be located at the exit pupil 157-3, the exit pupil 157-3 may be the output exit pupil, and the exit pupil 157-1 or 157-2 may be the leakage exit pupil.

In some embodiments, at least one (e.g., each) of the in-coupling element 135 or the out-coupling element 145 may include one or more diffraction gratings. For discussion purposes, a diffraction grating included in the in-coupling element 135 may be referred to as an in-coupling grating 135, and a diffraction grating included in the out-coupling element 145 may be referred to as an out-coupling grating 145. Each of the in-coupling grating 135 or the out-coupling grating 145 may be a reflective grating or a transmissive grating. The leaked beam 137 of the out-coupling grating 145 may include one or more undesirable diffraction orders, when the out-coupling grating 145 couples the second portion of the in-coupled beam 131 out of the light guide 110 via diffraction.

In some embodiments, at least one (e.g., each) of the in-coupling grating 135 or the out-coupling grating 145 may be polarization sensitive (or polarization selective), e.g., linear polarization selective, circular polarization selective, or elliptical polarization selective. A polarization selective grating may be configured to substantially diffract a beam having a first polarization, and substantially transmit a beam having a second polarization that is orthogonal to the first polarization. The polarization selective grating may also transmit the beam having the first polarization, while the transmission of the beam having the first polarization may be significantly less than the diffraction of the beam having the first polarization. The polarization selective grating may also diffract the beam having the second polarization, while the diffraction of the beam having the second polarization may be significantly less than the transmission of the beam having the second polarization. Examples of polarization selective gratings may include holographic polymer-dispersed liquid crystal ("H-PDLC") gratings, surface relief gratings provided (e.g., filled) with LCs, Pancharatnam-Berry phase ("PBP") gratings, polarization volume holograms ("PVHs"), etc. For example, when H-PDLC or surface relief grating filed with LCs are used, the signal beam and the leakage beam may have orthogonal polarizations. In some embodiments, the leakage beam may be filtered out by a polarizer.

In some embodiments, as shown in FIG. 1A, when the out-coupling grating 145 is a polarization selective grating, to enhance the brightness uniformity across the effective pupil of the light guide illumination assembly 103, the light guide 110 may also be coupled with one or more retardation films 123 (e.g., an A-plate) at the first surface 110-1 and/or the second surface 110-2. The position of the one or more retardation films 123 along the light guide 110 may be between the in-coupling grating 135 and the out-coupling grating 145. The retardation film 123 may be configured to convert the in-coupled beam 131 to be a substantially linearly or elliptically polarized beam, as the in-coupled beam 131 propagates inside the light guide 110 toward the out-coupling grating 145. In some embodiments, the retardation film 123 (e.g., A-plate) may randomize the polarization of the in-coupled beam 131, such that the in-coupled beam 131 is not a fully RHCP beam or a fully LHCP beam.

For illustrative purposes, in the embodiment shown in FIG. 1A, each of the in-coupling grating 135 and the out-coupling grating 145 may be a reflective polarization selective grating, e.g., a reflective PVH grating. The out-coupling grating 145 may couple, via diffraction, the in-coupled beam 131 out of the light guide 110 as the output beams 132 and the leaked beams 137. For example, the out-coupling grating 145 may be configured to substantially diffract a right-handed circularly polarized ("RHCP") beam, and substantially transmit a left-handed circularly polarized ("LHCP") beam. Thus, for the in-coupled beam 131 being a substantially linearly or elliptically polarized beam, the out-coupling grating 145 may substantially backwardly diffract the RHCP component of the in-coupled beam 131 as the output beam (e.g., an RHCP beam) 132, and slightly forwardly diffract the RHCP component of the in-coupled beam 131 as the leaked beam 137. The output beam 132 may be a reflected diffraction order (which is the desirable diffraction order for illumination), and the leaked beam 137 may be a transmitted diffraction order (which is the undesirable diffraction order resulting in the light leakage). The out-coupling grating 145 may substantially transmit the LHCP component of the in-coupled beam 131 (the transmit portion may be totally internally reflected at a surface of the out-coupling grating 145 and an outside environment, e.g., air), and slightly diffract the LHCP component of the in-coupled beam 131 as a leaked beam (not shown in FIG. 1A as the intensity is significantly less than the leaked beam 137).

In some embodiments, as shown in FIG. 1A, the diffraction angles of the output beam 132 and the leaked beam 137 output from opposite surfaces of the out-coupling grating 145 may have substantially the same absolute value and opposite signs. In the present disclosure, the diffraction angle of a beam output from an out-coupling element or grating is defined relative to a surface normal (e.g., the surface normal 166) of the out-coupling element or grating (e.g., the out-coupling grating 145). For example, the output beam 132 may have a positive diffraction angle having an absolute value $\alpha$, and the leaked beam 137 may have a negative diffraction angle having the absolute value $\alpha$. In some embodiments, as shown in FIG. 1A, the output beam (e.g., RHCP beam) 132 may be substantially normally incident onto the display panel 120 to illuminate the display panel 120. The display panel 120 may change the polarization of the output beam 132 to an orthogonal polarization while reflecting the output beam 132 back to the light guide 110. For example, the image beam 136 output from the display panel 120 may be an LHCP beam. The image beam 136 may propagate through the light guide 110 toward the out-coupling grating 145. In some embodiments, the out-coupling grating 145 may substantially transmit the image beam (e.g., LHCP beam) 136 without changing the propagation direction or polarization of the image beam 136. The lens assembly 102 may focus the image beam 136 as the image beam 138 (e.g., LHCP beam) propagating through the output exit pupil 157-1 where the eye pupil 158 is located. The lens assembly 102 may also focus the leaked beam 137 as the leaked beam 139 propagating through the leakage exit pupil 157-2 that is spaced apart from the exit pupil 157-1.

The tilt angle (absolute value $\alpha$) of the light guide 110 may be determined by parameters of the various elements included in the system 100, and a predetermined distance between the output exit pupil and the leakage exit pupil at the eye-box region 160. For example, when the distance (e.g., D2) between the output exit pupil and the leakage exit pupil at the eye-box region 160 is presumed to be 4 mm (which is about two times the length of the single exit pupil 157), the focal length of the lens assembly 102 is presumed to be 20 mm, then the angle (absolute value $\beta$) between the image beam 136 and the leaked beam 137 may be calculated as about arctan (4/20)=11.3°. Thus, the tilt angle (absolute value $\alpha$) of the light guide 110 may be calculated as 11.3°/2=5.65°. When the light guide 110 is presumed to have a length of 36 mm in the X-axis direction, a tilt distance d of the light guide 110 along the z-axis direction may be calculated as about 36*sin)(5.65°=3.53 mm. For example, when the distance (e.g., D2) between the output exit pupil and the leakage exit pupil at the eye-box region 160 is presumed to be 8 mm (which is about four times the length of the single exit pupil 157), then the angle (absolute value β) between the image beam 136 and the leaked beam 137 may be calculated as about arctan (8/20)=21.8°. Thus, the tilt angle (absolute value α) of the light guide 110 may be calculated as 21.8°/2=10.9°. In some embodiments, when a minimum distance (e.g., D2) between the output exit pupil and the leakage exit pupil at the eye-box region 160 is set to be 2 mm (which is about the length of the single exit pupil 157), the angle (absolute value β) between the image beam 136 and the leaked beam 137 may be calculated as about arctan (2/20)=5.7°. Thus, the tilt angle (absolute value α) of the light guide 110 may be calculated as 5.7°/2=2.85°.

In the embodiment show in FIG. 1A, through tilting the light guide 110 by a predetermined angle (absolute value α) relative to an axis that is perpendicular to the axis 104, the image beam 138 and the leaked beam 139, which would otherwise propagate through the same exit pupil in the eye-box region 160, may propagate through two separated exit pupils, e.g., the output exit pupil 157-1 and the leakage exit pupil 157-2. Thus, the eye pupil 158 located at the output exit pupil 157-1 may receive the image beam 136 that represents the virtual image generated by the display panel 120, and may not receive the leaked beam 139, which may otherwise cause a reduction in the contrast ratio if received. Thus, the contrast ratio of the virtual image perceived by the eye 159 may be enhanced as compared to a conventional system shown in FIG. 6, in which the light guide 30 is perpendicular to the axis 70, or is parallel with the lens assembly 62 (or the display panel 61), i.e., the surface normal of the light guide 30 is not tilted with respect to the axis 70 of the display panel 61 or the lens assembly 62 (i.e., the surface normal of the light guide 30 is parallel with the axis 70).

Figure 1B:
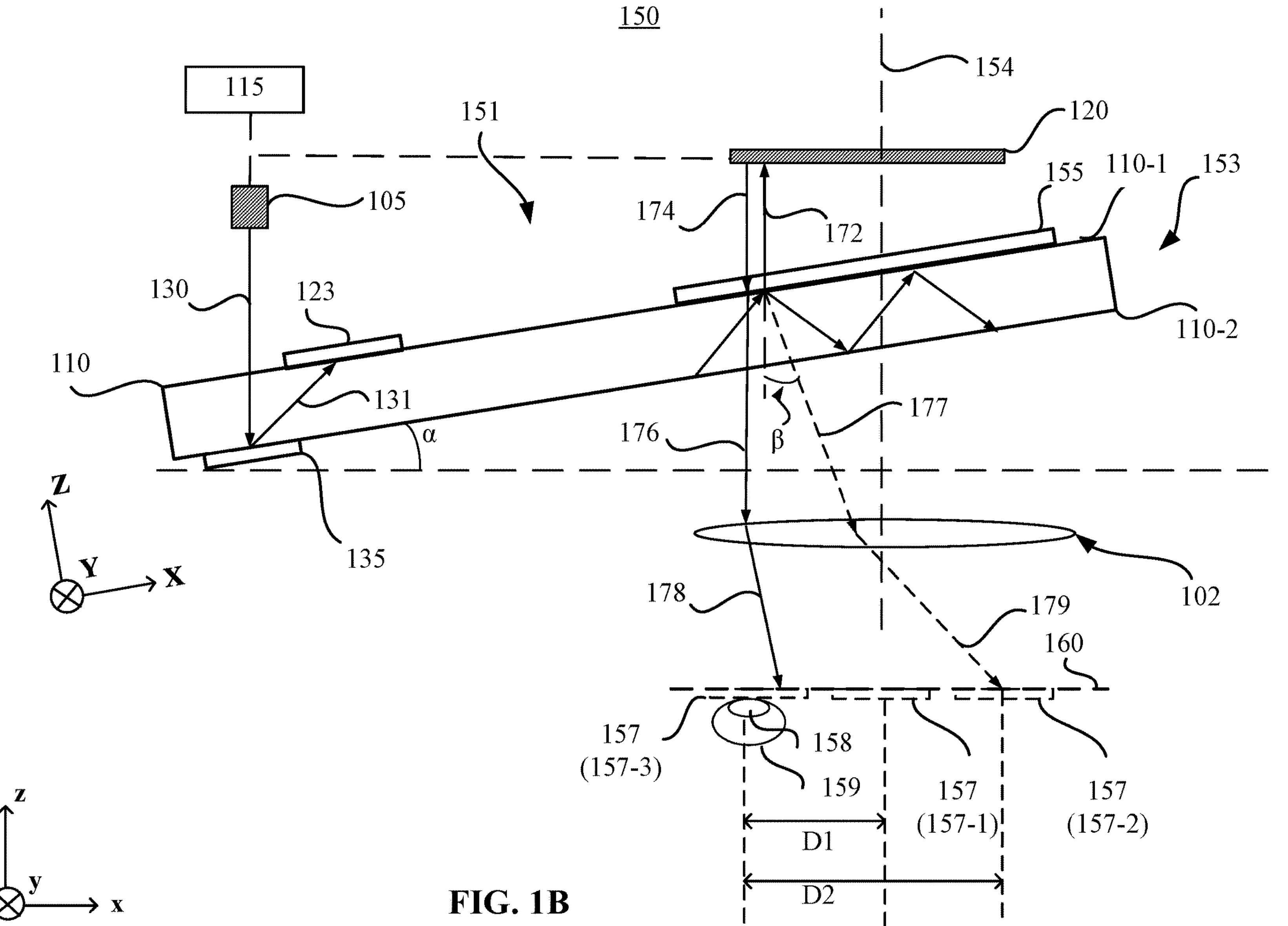
FIG. 1B schematically illustrates a diagram of a system including a light guide illumination assembly for providing an increased contrast, according to an embodiment of the present disclosure.

FIG. 1B schematically illustrates an x-z sectional view of a system 150 configured to provide an increased contrast, according to an embodiment of the present disclosure. The system 150 may include elements that are similar to or the same as those included in the system 100 shown in FIG. 1A. Descriptions of the same or similar elements or features can refer to the above corresponding descriptions, including those rendered in connection with FIG. 1A. As shown in FIG. 1B, the system 150 may include a display assembly 151 and the viewing optics assembly 102. The display assembly 151 may include the display element (e.g., display panel) 120, and a light guide illumination assembly 153 configured to output a beam 172 for illuminating the display panel 120.

In the embodiment shown in FIG. 1B, an out-coupling grating 155 coupled with the light guide 110 may include a transmissive polarization selective grating, e.g., a transmissive PVH grating. The out-coupling grating 155 may couple, via diffraction, a first portion (or a major portion) the in-coupled beam 131 to a first side of the out-coupling grating 155 out of the light guide 110 as output beams 172 propagating toward the display panel 120. The out-coupling grating 155 may couple, via diffraction, a second portion (or a minor portion) of the in-coupled beam 131 to a second side of the out-coupling grating 155 out of the light guide 110 as leaked beams 177 propagating toward the lens assembly 102. The propagation directions of the output beams 172 and the leaked beams 177 may not be parallel with one another. That is, the output beams 172 and the leaked beams 177 may not propagate along two opposite directions of a same axis. An angle formed between the propagation directions of the output beams 172 and the leaked beams 177 may be greater than 0° and less than 180°.

For discussion purposes, the out-coupling grating 155 may be configured to substantially diffract an RHCP beam as an LHCP beam, and substantially transmit an LHCP beam as an LHCP beam. Thus, for the in-coupled beam 131 being a substantially linearly or elliptically polarized beam, the out-coupling grating 145 may substantially forwardly diffract the RHCP component of the in-coupled beam 131 as the output beam (e.g., LHCP beam) 172, and slightly backwardly diffract the RHCP component of the in-coupled beam 131 as the leaked beam 177. In FIG. 1B, the output beam 172 may be a transmitted diffraction order (which is the desirable diffraction order for illumination), and the leaked beam 177 may be a reflected diffraction order (which is the undesirable diffraction order resulting in the light leakage). The out-coupling grating 145 may substantially transmit the LHCP component of the in-coupled beam 131, and slightly diffract the LHCP component of the in-coupled beam 131 as a leaked beam (not shown in FIG. 1B as the intensity is significantly less than the leaked beam 177).

In some embodiments, as shown in FIG. 1B, the output beam (e.g., LHCP beam) 172 may be substantially normally incident onto the display panel 120 to illuminate the display panel 120. The display panel 120 may modulate and reflect the output beam (e.g., LHCP beam) 172 as an image beam (e.g., RHCP beam) 174. The image beam 174 may propagate through the light guide 110 toward the out-coupling grating 155. The out-coupling grating 155 may substantially transmit the image beam (e.g., RHCP beam) 174 as an image light (e.g., LHCP beam) 176 propagating toward the lens assembly 102. The lens assembly 102 may focus the image beam 176 as an image beam 178 propagating through a third exit pupil 157-3 where the eye pupil 158 is located. The lens assembly 102 may also focus the leaked beam 177 as a leaked beam 179 propagating through the second exit pupil 157-2. In such an embodiment, the third exit pupil 157-3 may be the output exit pupil, and the second exit pupil 157-2 may be the leakage exit pupil.

Through tilting the light guide 110 by a predetermined angle (absolute value α), the image beam 178 and the leaked beam 179, which would otherwise propagate through the same exit pupil in the eye-box region and be received by the eye, may propagate through two separate exit pupils, e.g., the output exit pupil 157-3 and the leakage exit pupil 157-2. Thus, the eye 159 located at the output exit pupil 157-3 may receive the image beam 178 that represents the virtual image generated by the display panel 120, and may not receive the leaked beam 179. As a result, the leaked beam 179 may not cause a reduction in the contrast ratio of the virtual image perceived by the eye 159, and the contrast ratio of the virtual image perceived by the eye 159 may be enhanced as compared with the conventional system shown in FIG. 6.

Figure 1C:
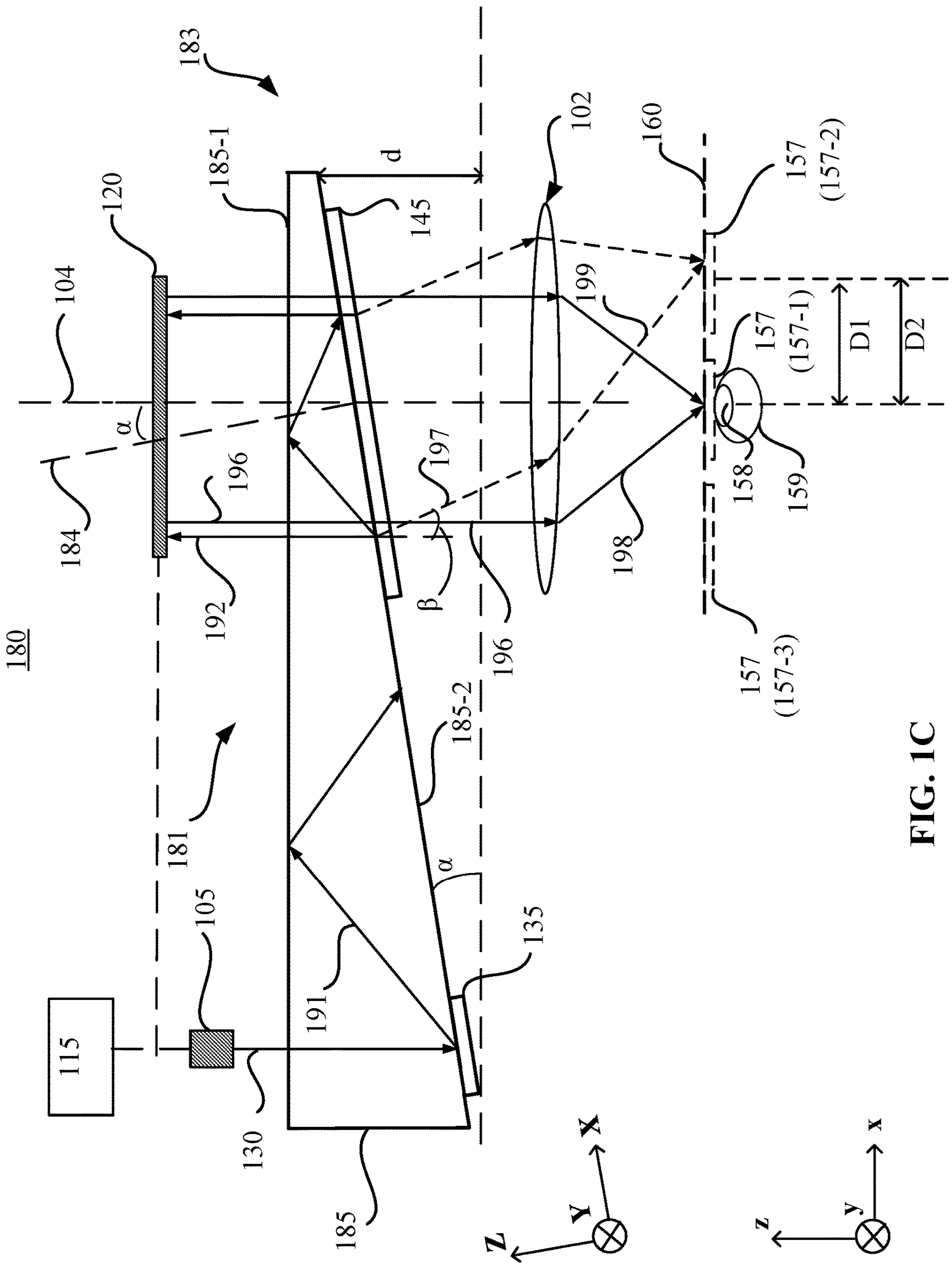
FIG. 1C schematically illustrates a diagram of a system including a light guide illumination assembly for providing an increased contrast, according to an embodiment of the present disclosure.

FIG. 1C schematically illustrates an x-z sectional view of a system 180 configured to provide an increased contrast, according to an embodiment of the present disclosure. The system 180 may include elements that are similar to or the same as those included in the system 100 shown in FIG. 1A, or the system 150 shown in FIG. 1B. Descriptions of the same or similar elements or features can refer to the above corresponding descriptions, including those rendered in connection with FIG. 1A or FIG. 1B. As shown in FIG. 1C, the system 180 may include a display assembly 181 and the viewing optics assembly 102. The display assembly 181 may include the display element (e.g., display panel) 120, and a light guide illumination assembly 183 configured to output a beam 192 for illuminating the display panel 120. The display panel 120 and the lens assembly 102 may be arranged in parallel, and may be aligned perpendicular to the same axis 104. The axis 104 may be the optical axis of the lens assembly 102, or the axis of symmetry of the display panel 120.

The light guide illumination assembly 183 may include a light guide 185 coupled with the in-coupling grating 135 and the out-coupling grating 145. In the embodiment shown in FIG. 1C, the light guide 185 may have a first surface 185-1 facing the display panel 120 and a second surface 185-2 facing the lens assembly 102, with the first surface 185-1 being unparallel with the second surface 185-2. One of the first surface 185-1 and the second surface 185-2 where the out-coupling grating 145 is disposed may be tilted with respect to the lens assembly 102 (or the display panel 120), by an angle (absolute value $\alpha$), and the other surface of the first surface 185-1 and the second surface 185-2 may be parallel with the lens assembly 102 (or the display panel 120).

For discussion purposes, FIG. 1C shows that the out-coupling grating 145 is disposed at the second surface 185-2. Thus, the second surface 185-2 may be tilted with respect to the lens assembly 102 (or the display panel 120), by an angle (absolute value $\alpha$). In other words, a surface normal 184 of the second surface 185-2 of the light guide 185 (or a surface normal 184 of the out-coupling element 145) may be tilted by an angle (absolute value $\alpha$) with respect to the axis 104 of the display panel 120 or the lens assembly 102. The first surface 185-1 may be parallel with the lens assembly 102 (or the display panel 120). In other words, a surface normal (not shown) of the first surface 185-1 of the light guide 185 may be parallel with the axis 104 of the display panel 120 or the lens assembly 102.

Although not shown in FIG. 1C, in some embodiments, the out-coupling grating 145 may be disposed at the first surface 185-1. Thus, a surface normal of the first surface 185-1 of the light guide 185 (or a surface normal of the out-coupling element 145) may be tilted by an angle (absolute value $\alpha$) with respect to the axis 104 of the display panel 120 or the lens assembly 102, and a surface normal of the second surface 185-2 of the light guide 185 may be parallel with the axis 104 of the display panel 120 or the lens assembly 102.

When the second surface 185-2 of the light guide 185 is tilted by the angle (absolute value $\alpha$), the beam 130 output from the light source assembly 105 may be incident onto the in-coupling grating 135 at an incidence angle (absolute value $\alpha$) with respect to a surface normal of the in-coupling element 135. The in-coupling grating 135 may couple the beam 130 as an in-coupled beam 191 propagating along the light guide 185 toward the out-coupling grating 145 via TIR. The out-coupling grating 145 may couple a first portion (e.g., a major portion) of the in-coupled beam 191 out of the light guide 185 as a plurality of output beams 192 each having an output angle (absolute value $\alpha$) with respect to a surface normal of the out-coupling grating 145 (or a surface normal of the second surface 185-2 of the light guide 185). The output beam 192 may be output toward the display panel 120 located at the first side of the out-coupling grating 145 or the light guide 185. The output beam 192 may be modulated and reflected by the display panel 120 as an image beam 196 representing a virtual image displayed by the display panel 120. The image beam 196 may be parallel with the output beam 192 that is incident onto the display panel 120. The image beam 196 and the output beam 192 may propagate in opposite directions along the same axis parallel with the axis 104. The image beam 196 may propagate through the light guide 185 and the out-coupling grating 145 (and the redirecting grating 140, if included), without changing the propagation direction.

The out-coupling grating 145 may couple a second portion (e.g., a minor portion) of the in-coupled beam 191 to a second side of the out-coupling grating 145 out of the light guide 185 as a plurality of leaked beams 197 each having an output angle (absolute value $\alpha$) with respect to the surface normal of the out-coupling grating 145 (or the surface normal of the second surface 185-2 of the light guide 185). The leaked beam 197 may be output toward the lens assembly 102 located at a second side of the out-coupling grating 145 or the light guide 185. The propagation directions of the output beam 192 and the leaked beam 197 may not be along a same axis. That is, the propagation directions of the output beam 192 and the leaked beam 197 may not be parallel with one another. The propagation directions of the output beam 192 and the leaked beam 197 may form an angle that is greater than 0° and less than 180°.

The tilt angle (absolute value $\alpha$) of the second surface 185-2 of the light guide 185 may be configured, such that an angular separation (an angle with absolute value $\beta$) formed between the image beam 196 and the leaked beam 197 may be greater than or equal to a predetermined angle. When the image beam 196 is focused by the lens assembly 102 as the image beam 198, and the leaked beam 197 is focused by the lens assembly 102 as a leaked beam 199, the image beam 198 may propagate through the first exit pupil 157-1 where the eye pupil 158 is located, and the leaked beam 199 may propagate through a spatial location in the eye-box region 160 that is outside of the first exit pupil 157-1. For example, the spatial location in the eye-box region 160 where the leaked beam 199 propagates through may be the second exit pupil 157-2 that does not correspond to the position of the eye pupil 158. Thus, the eye pupil 158 located at the first exit pupil may receive the image beam 196 that represents the virtual image generated by the display panel 120, and may not receive the leaked beam 199. As a result, the leaked beam 199 may not cause a reduction in the contrast ratio of the virtual image perceived by the eye 159, and the contrast ratio of the virtual image perceived by the eye 159 may be enhanced as compared to the conventional system shown in FIG. 6.

Figure 2A:
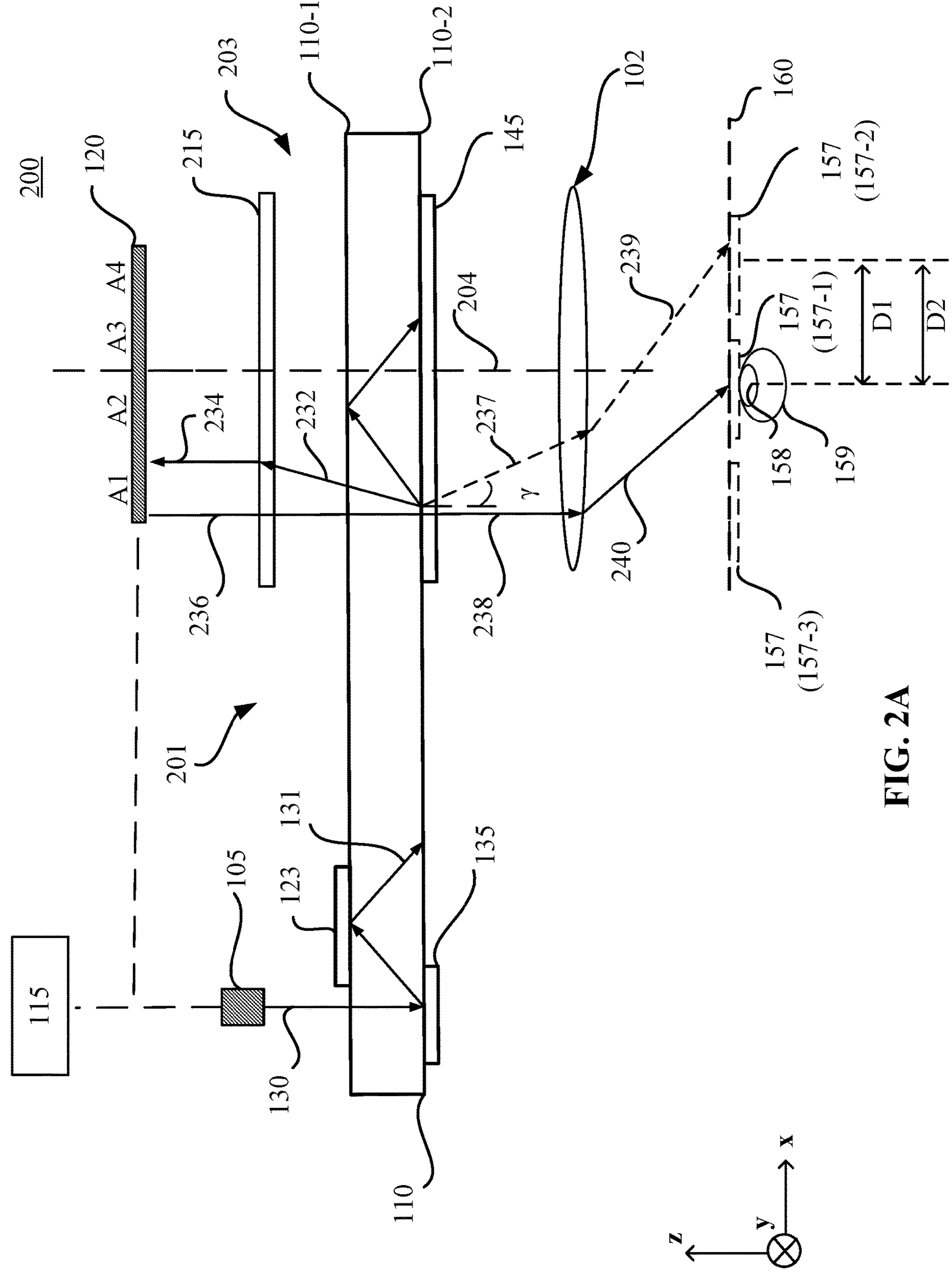
FIG. 2A schematically illustrates a diagram of a system including a light guide illumination assembly for providing an increased contrast, according to an embodiment of the present disclosure.

FIG. 2A schematically illustrates an x-z sectional view of a system 200 for providing an increased contrast, according to an embodiment of the present disclosure. The system 200 may include elements that are similar to or the same as those included in the system 100 shown in FIG. 1A, the system 150 shown in FIG. 1B, or the system 180 shown in FIG. 1C.

Descriptions of the same or similar elements or features can refer to the above corresponding descriptions, including those rendered in connection with FIG. 1A, FIG. 1B, or FIG. 1C. As shown in FIG. 2A, the system 200 may include a display assembly 201, the viewing optics assembly 102, and the controller 115. The display assembly 201 may include the display panel 120 and a light guide illumination assembly 203 configured to output a beam 234 to illuminate the display panel 120. The light guide illumination assembly 203 may include the light source assembly 105, the light guide 110 coupled with the in-coupling element 135 and the out-coupling element 145. The viewing optics assembly 102 may include the lens assembly 102.

In the embodiment shown in FIG. 2A, the light guide 110, the display panel 120, and the lens assembly 102 may be arranged in parallel, e.g., arranged perpendicular to an axis 204, which may be an optical axis of the lens assembly 102 or an axis of symmetry of the display panel 120. The in-coupling element 135 may couple the input beam 130 as the in-coupled beam 131 propagating inside the light guide 110 via TIR. The out-coupling element 145 may couple a first portion (e.g., a major portion) of the in-coupled beam 131 out of the light guide 110 as a plurality of output beams 232 propagating toward the display panel 120, and a second portion (e.g., a minor portion) of the in-coupled beam 131 out of the light guide 110 as a plurality of leaked beams 237 propagating toward the lens assembly 102. FIG. 2A shows a single ray of a single output beam 232 and a single ray of a single leaked beam 237 for illustrative purposes.

In the disclosed embodiments, to mitigate the reduction in the contrast ratio that may be caused by the leaked beam 237, the light guide illumination assembly 203 may further include a beam deflecting element 215 disposed between the light guide 110 and the display panel 120. The beam deflecting element 215 may at least partially overlap with the out-coupling element 145 in, e.g., an x-axis direction as shown in FIG. 2A. FIG. 2A shows that the beam deflecting element 215 is spaced apart from the light guide 110 by a gap. In some embodiments, beam deflecting element 215 may be disposed at the first surface 110-1 of the light guide 110.

In the embodiment shown in FIG. 2A, the beam deflecting element 215 may be polarization selective. For example, the beam deflecting element 215 may be configured to forwardly deflect a beam with a predetermined polarization (e.g., forwardly diffract the beam to propagate in a propagation direction different from the original propagation direction of the beam). The beam deflecting element 215 may transmit a beam with a polarization that is orthogonal to the predetermined polarization while maintaining the propagation direction of the beam. In some embodiments, the beam deflecting element 215 may be configured to maintain a polarization of the input beam while deflecting the input beam. In some embodiments, the beam deflecting element 215 may be configured to change a polarization of the input beam while deflecting the input beam. For example, the beam deflecting element 215 may convert a polarization of the input beam to an orthogonal polarization, while deflecting the input beam. In some embodiments, the beam deflecting element 215 may be configured with an optical power. In some embodiments, the beam deflecting element 215 may include a polarization selective diffractive element with an optical power (or referred to as a polarization selective diffractive lens), e.g., a PVH grating with an optical power, an H-PDLC grating with an optical power, or an LC-filled surface relief grating with an optical power, etc.

In some embodiments, the beam deflecting element 215 may be circular polarization selective. For example, the beam deflecting element 215 may be configured to forwardly deflect a circularly polarized beam with a predetermined handedness, and transmit a circularly polarized beam with a handedness that is opposite to the predetermined handedness. In some embodiments, the beam deflecting element 215 may be configured to substantially maintain the handedness of a circularly polarized input beam, while deflecting the circularly polarized input beam. In some embodiments, the beam deflecting element 215 may be configured to change the handedness of the circularly polarized input beam to the opposite handedness, while deflecting the circularly polarized input beam.

In the embodiment shown in FIG. 2A, the beam deflecting element 215 may be configured to substantially maintain the handedness of a circularly polarized input beam, while deflecting the circularly polarized input beam. The polarization selective diffractive element included in the beam deflecting element 215 may be an H-PDLC grating with an optical power, or an LC-filled surface relief gratings with an optical power, etc. In some embodiments, the beam deflecting element 215 may also include a waveplate (e.g., a quarter-wave plate) coupled with the polarization selective diffractive element. The waveplate may be disposed between the polarization selective diffractive element and the light guide 110. The waveplate may be configured to convert a circularly polarized beam to a linearly polarized beam, and convert a linearly polarized beam to a circularly polarized beam.

As shown in FIG. 2A, when the in-coupled beam 131 interacts with the out-coupling grating 145, the out-coupling grating 145 may substantially backwardly diffract the RHCP component of the in-coupled beam 131 out of the light guide 110 as the output beam (e.g., an RHCP beam) 232 propagating toward the beam deflecting element 215. The out-coupling grating 145 may slightly forwardly diffract the RHCP component of the in-coupled beam 131 as the leaked beam 237 propagating toward the lens assembly 102. In FIG. 2A, the output beam 232 may be a reflected diffraction order (which is the desirable diffraction order for illumination), and the leaked beam 237 may be a transmitted diffraction order (which is the undesirable diffraction order resulting in the light leakage). The out-coupling grating 145 may substantially transmit the LHCP component of the in-coupled beam 131, and slightly diffract the LHCP component of the in-coupled beam 131 as a leaked beam (not shown in FIG. 2A as the intensity is significantly less than the leaked beam 237).

In some embodiments, as shown in FIG. 2A, the diffraction angles of the output beam 232 and the leaked beam 237 outputting to opposite sides of the out-coupling element 145 may have substantially the same absolute value and opposite signs. For example, the output beam 232 may have a positive diffraction angle of $\gamma$, and the leaked beam 237 may have a negative diffraction angle of $(-\gamma)$.

The beam deflecting element 215 may deflect (e.g., forwardly diffract) the output beam (e.g., RHCP beam) 232 as a beam (e.g., an RHCP beam) 234 propagating toward the display panel 120. For example, the beam 234 may be normally incident onto the display panel 120. The display panel 120 may modulate and reflect the beam (e.g., RHCP beam) 234 as an image beam (e.g., an LHCP beam) 236. Here, the modulation performed by the display panel 120 includes changing the circular polarization of the beam 234 from the right-handed circular polarization to left-handed circular polarization. The beam deflecting element 215 may substantially transmit the image beam (e.g., LHCP beam) 236 toward the light guide 110. The image beam 236 may propagate through the light guide 110 toward the out-coupling grating 145. The out-coupling grating 145 may substantially transmit the image beam (e.g., LHCP beam) 236 as an image beam 238 toward the lens assembly 102 without changing the propagation direction. The beam deflecting element 215 may be configured, such that an angular separation (i.e., an angle $\gamma$ formed) between the leaked beam 237 and the image beam 238 (or the image beam 236) may be configured to be greater than or equal to a predetermined angle. Thus, the lens assembly 102 may focus the image beam 238 and the leaked beam 237 to two separate exit pupils at the eye-box region 160. For example, FIG. 2A shows that the lens assembly 102 focuses the image beam 238 as an image beam 240 propagating through the first exit pupil 157-1 where the eye pupil 158 is located, and focuses the leaked beam 237 as a leaked beam 239 propagating through the second exit pupil 157-2. In such an embodiment, the exit pupil 157-1 may be the output exit pupil, and the exit pupil 157-2 may be the leakage exit pupil. In some embodiments, a distance D2 between the output exit pupil (e.g., 157-1) and the leakage exit pupil (e.g., 157-2) may be greater than or equal to the distance D1 between two neighboring exit pupils 157. Thus, the eye 159 located at the output exit pupil 157-1 may receive the image beam 238 that represents the virtual image generated by the display panel 120, and may not receive the leaked beam 239.

In some embodiments, it may be desirable for the respective portions of the display panel 120, e.g., A1, A2, A3, A4, etc., to be illuminated by respective illumination beams output from the light guide 110 at respective predetermined incidence angles, such that respective chief rays originating from the respective portions of the display panel 120 and passing through the center of the aperture stop of the lens assembly 102 (e.g., the center of the lens film of the lens assembly 102) may form respective predetermined angles with respect to the axis 204. In the disclosed embodiments, the output beams 232 propagating toward the beam deflecting element 215 may be parallel. Note that FIG. 2A only shows a single output beam 232 for illustrative purposes. For the output beams 232 output from different portions of the light guide 110, the beam deflecting element 215 may deflect (e.g., forwardly diffract) the respective output beams 232 as respective deflected beams 234 propagating toward respective portions of the display panel 120, e.g., A1, A2, A3, A4, etc. For example, the optical power of the beam deflecting element 215 may be configured, such that the beam deflecting element 215 may deflect (e.g., forwardly diffract) the respective output beams 232 by different predetermined angles, to render the respective deflected beams 234 that are incident onto respective portions of the display panel 120 at the respective predetermined incidence angles. For example, different portions of the beam deflecting element 215 may be configured with different optical powers, such that the output beams 232 incident onto different portions of the beam deflecting element 215 may be deflected (e.g., forwardly diffracted) at different angles toward the display panel 120. Thus, when the display panel 102 is illuminated by the respective deflected beams 234, the respective chief rays originating from the respective portions of the display panel 120 and passing through the center of the aperture stop of the lens assembly 102 form the respective predetermined angles with respect to the axis 204.

For example, it may be desirable for the portion A1 of the display panel 120 to receive an illumination beam that is normally incident onto the portion A1, such that the chief ray originating from the portion A1 of the display panel 120 and passing through the center of the aperture stop of the lens assembly 102 may form a predetermined angle (e.g., 30°) with respect to the axis 204. The beam deflecting element 215 may be configured to deflect the output beam 232 having the positive diffraction angle of $\gamma$ as the reflected beam 234 that is normally incident onto the portion A1. Thus, the chief ray included in the image beam 236 reflected from the portion A1 forms the predetermined angle (e.g., 30°) with respect to the axis 204.

In the disclosed embodiments, through introducing the beam deflecting element 215, the image beam 238 and the leaked beam 239 which would otherwise propagate through the same exit pupil in the eye-box region and be received by the eye, may propagate through two separate exit pupils, e.g., the output exit pupil 157-1 and the leakage exit pupil 157-2. Thus, the eye pupil 158 located at the output exit pupil 157-1 may receive the image beam 238 that represents the virtual image generated by the display panel 120, and may not receive the leakage beam 239. In addition, the respective chief rays originating from the respective portions of the display panel 120 may still have the respective predetermined incidence angles at the lens assembly 102, which may be substantially the same as those designed for a conventional system (e.g., the conventional NED 60 shown in FIG. 6) that does not include the beam deflecting element 215. Thus, compared to a conventional system (e.g., the conventional NED 60 shown in FIG. 6) that does not include the beam deflecting element 215, the formation of the virtual image via the lens assembly 102 may not be affected by the beam deflecting element 215, while the contrast ratio of the virtual image perceived by the eye 159 may be increased.

Figure 2B:
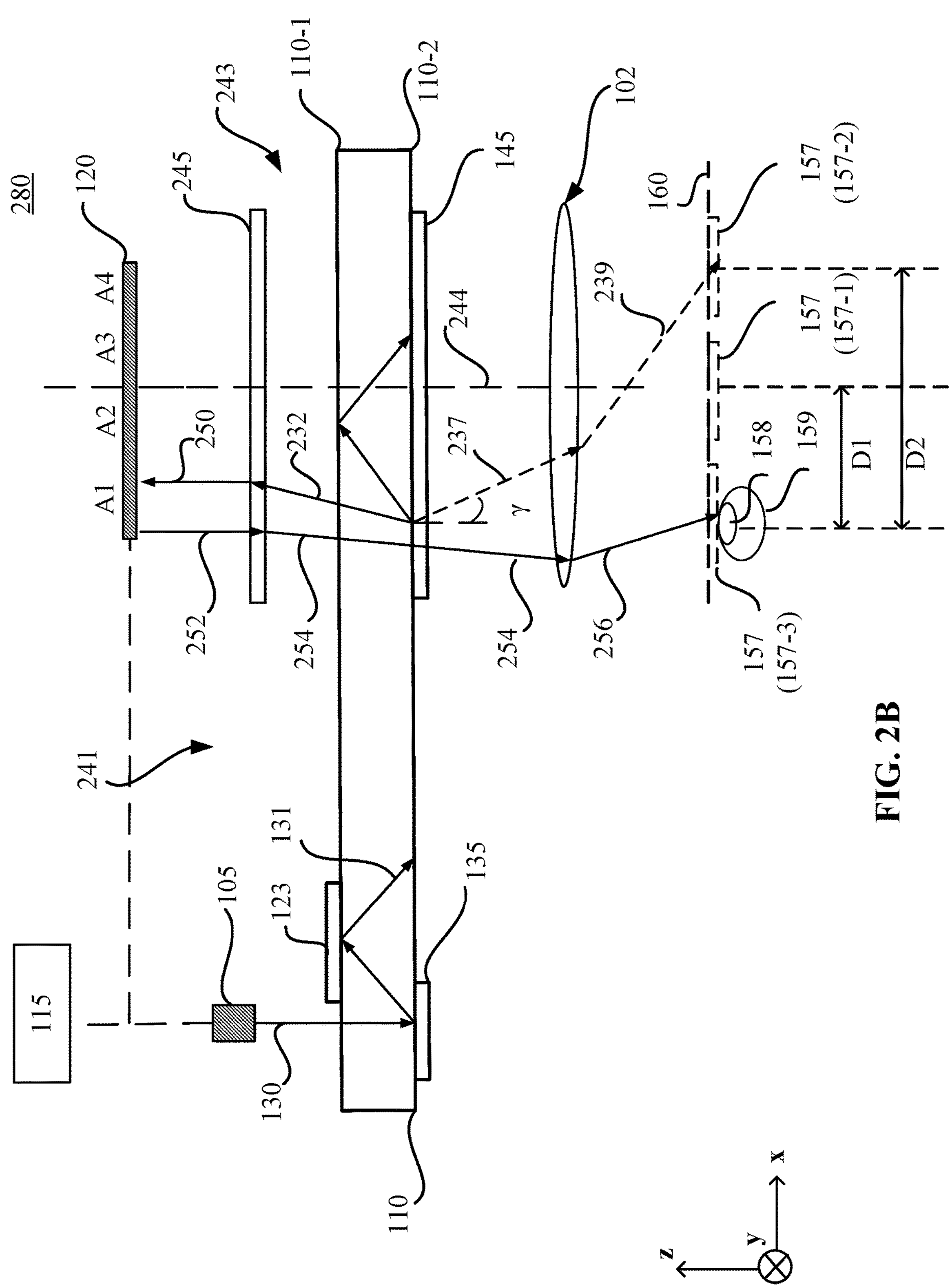
FIG. 2B schematically illustrates a diagram of a system including a light guide illumination assembly for providing an increased contrast, according to an embodiment of the present disclosure.

FIG. 2B schematically illustrates an x-z sectional view of a system 280 configured to provide an increased contrast, according to an embodiment of the present disclosure. The system 280 may include elements that are similar to or the same as those included in the system 100 shown in FIG. 1A, the system 150 shown in FIG. 1B, the system 180 shown in FIG. 1C, or the system 200 shown in FIG. 2A. Descriptions of the same or similar elements or features can refer to the above corresponding descriptions, including those rendered in connection with FIG. 1A, FIG. 1B, FIG. 1C, or FIG. 2A.

As shown in FIG. 2B, the system 280 may include a display assembly 241, the viewing optics assembly 102, and the controller 115. The display assembly 241 may include the display element (e.g., display panel) 120 and a light guide illumination assembly 243 configured to output a beam 250 for illuminating the display panel 120. The light guide illumination assembly 243 may include a beam deflecting element 245 disposed between the light guide 110 and the display panel 120. The beam deflecting element 245 may be similar to the beam deflecting element 215 shown in FIG. 2A. For example, the beam deflecting element 245 may be polarization selective, which may, e.g., forwardly deflect a circularly polarized beam with a predetermined handedness, and transmit circularly polarized beam with a handedness that is opposite to the predetermined polarization. In the embodiment shown in FIG. 2B, the beam deflecting element 245 may convert the handedness of a circularly polarized input beam to an opposite handedness, while deflecting the circularly polarized input beam. For example, the beam deflecting element 245 may include a polarization selective diffractive element, such as a transmissive PVH grating configured with an optical power. The beam deflecting element 245 may not include a waveplate disposed between the polarization selective diffractive element and the light guide 110.

As shown in FIG. 2B, the beam deflecting element 245 may be configured to deflect (e.g., forwardly diffract) the output beam (e.g., RHCP beam) 232 as the beam (e.g., an LHCP beam) 250 propagating toward the display panel 120. The display panel 120 may modulate and reflect the beam (e.g., LHCP beam) 250 as an image beam (e.g., an RHCP beam) 252. The beam deflecting element 245 may be configured to deflect (e.g., forwardly diffract) the image beam (e.g., RHCP beam) 252 as an image beam (e.g., an LHCP beam) 254. The image beam 254 may propagate through the light guide 110 toward the out-coupling grating 145. The out-coupling grating 145 may substantially transmit the image beam (e.g., LHCP beam) 254. The beam deflecting element 245 may be configured such that after the output beam 232 is deflected by the beam deflecting element 245 for two times (as shown in FIG. 2B, a first time from the beam 232 to the beam 250, and the second time from the beam 252 to the beam 254), an angular separation between the leaked beam 237 and the image beam 254 may be configured to be greater than or equal to a predetermined angle. Thus, the lens assembly 102 may focus the image beam 254 and the leaked beam 237 to two separate exit pupils at the eye-box region 160.

For example, FIG. 2B shows that the lens assembly 102 focuses the image beam 254 as an image beam 256 propagating through the third exit pupil 157-3 where the eye pupil 158 is located, and focuses the leaked beam 237 as the leaked beam 239 propagating through the second exit pupil 157-2. In such an embodiment, the third exit pupil 157-3 may be the output exit pupil, and the second exit pupil 157-2 may be the leakage exit pupil. In some embodiments, a distance D2 between the output exit pupil (e.g., 157-3) and the leakage exit pupil (e.g., 157-2) may be greater than or equal to the distance D1 between two neighboring exit pupils 157. Thus, the eye 159 located at the output exit pupil 157-3 may receive the image beam 238 that represents the virtual image generated by the display panel 120, and may not receive the leakage beam 239. Accordingly, the contrast ratio of the virtual image perceived by the eye 159 may be enhanced as compared to a conventional system (e.g., the conventional NED 60 shown in FIG. 6) that does not include the beam deflecting element 245.

In some embodiments, it may be desirable for the respective chief rays originating from respective portions of the display panel 120 (e.g., A1, A2, A3, A4, etc.) and passing through the center of the aperture stop of the lens assembly 102 (e.g., the center of the lens film of the lens assembly 102) to form respective predetermined angles with an axis 244, which may be an optical axis of the lens assembly 102 or an axis of symmetry of the display panel 120. In the embodiment shown in FIG. 2B, the output beams 232 propagating toward the beam deflecting element 245 may be parallel. It is noted that in FIG. 2B only a single beam 232 is shown for illustrative purposes. The optical power of the beam deflecting element 245 may be configured such that after the respective output beams 232 are reflected by the beam deflecting element 245 for two times (e.g., a first time from 232 to 250, and a second time from 252 to 254), the respective chief rays (included in the respective image beams 254) may form the respective predetermined angles with respect to the optical axis 244. For example, it may be desirable for the chief ray originating from the portion A1 of the display panel 120 to form a predetermined angle (e.g., 30°) with the axis 244. The beam deflecting element 245 may deflect the output beam 232 having the positive diffraction angle of $\gamma$ as the beam 250 propagating toward the portion A1 of the display panel 120. The portion A1 of the display panel 120 may reflect the beam 250 as the image beam 252. The beam deflecting element 245 may deflect the image beam 252 as the image beam 254 propagating toward the lens assembly 102. After the output beam 232 is deflected by the beam deflecting element 245 for two times, the chief ray included in the image beam 254 (that is reflected from the portion A1 of the display panel 102) may form the predetermined angle (e.g., 30°) with respect to the axis 244.

Figure 3:
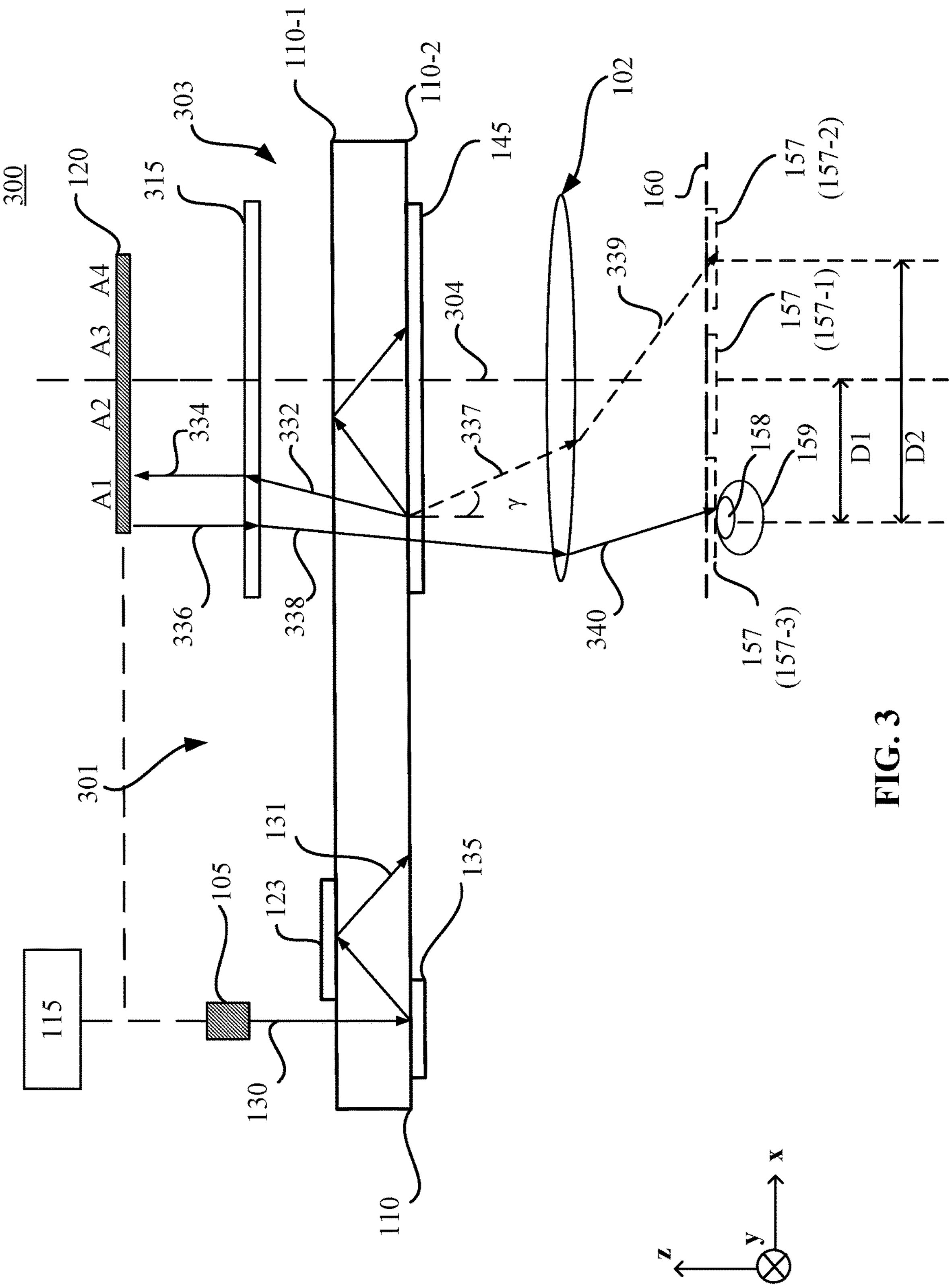
FIG. 3 schematically illustrates a diagram of a system including a light guide illumination assembly for providing an increased contrast, according to an embodiment of the present disclosure.

FIG. 3 schematically illustrates an x-z sectional view of a system 300 configured to provide an increased contrast, according to an embodiment of the present disclosure. The system 300 may include elements that are similar to or the same as those included in the system 100 shown in FIG. 1A, the system 150 shown in FIG. 1B, the system 180 shown in FIG. 1C, the system 200 shown in FIG. 2A, or the system 280 shown in FIG. 2B. Descriptions of the same or similar elements or features can refer to the above corresponding descriptions, including those rendered in connection with FIG. 1A, FIG. 1B, FIG. 1C, FIG. 2A, or FIG. 2B. As shown in FIG. 3, the system 300 may include a display assembly 301, the viewing optics assembly 102 (also referred to as the lens assembly 102), and the controller 115. The display assembly 301 may include the display panel 120 and a light guide illumination assembly 303 configured to output a light (or beam) 334 to the display panel 120 for illuminating the display panel 120. The light guide illumination assembly 303 may include the light source assembly 105, and the light guide 110 coupled with the in-coupling element 135 and the out-coupling element 145.

In the embodiment shown in FIG. 3, the light guide 110, the display panel 120, and the lens assembly 102 may be arranged in parallel. For example, the light guide 110, the display panel 120 and the lens assembly 102 may be arranged perpendicular to a same axis 304, which may be an optical axis of the lens assembly 102, or an axis of symmetry of the display panel 120. The in-coupling element 135 may couple the input beam 130 as the in-coupled beam 131 propagating inside the light guide 110 via TIR. The out-coupling element 145 may couple a first portion (e.g., a major portion) of the in-coupled beam 131 to a first side of the out-coupling element 145 out of the light guide 110 as a plurality of output beams 332 propagating toward the display panel 120, and couple a second portion (e.g., a minor portion) of the in-coupled beam 131 to a second side of the out-coupling element 145 out of the light guide 110 as a plurality of leaked beams 337 propagating toward the lens assembly 102. FIG. 3 shows a single ray of a single output beam 332 and a single ray of a single leaked beam 337 for illustrative purposes.

In the disclosed embodiments, to mitigate the reduction of the contrast ratio that may be caused by the leaked beam 337, the light guide illumination assembly 303 may further include a beam deflecting element 315 disposed between the light guide 110 and the display panel 120. The beam deflecting element 315 may at least partially overlap with the out-coupling element 145 in, e.g., an x-axis direction in FIG. 3. FIG. 3 shows that the beam deflecting element 315 is spaced apart from the light guide 110 by a gap. In some embodiments, the beam deflecting element 315 may be disposed at the first surface 110-1 of the light guide 110.

In the embodiment shown in FIG. 3, the beam deflecting element 315 may be polarization non-selective (or polarization insensitive). The polarization non-selective beam deflecting element 315 may be configured to forwardly deflect an input beam independent of a polarization of the input beam. In some embodiments, the beam deflecting element 315 may be configured to maintain a polarization of the input beam while deflecting the input beam. In some embodiments, the beam deflecting element 315 may be configured with an optical power. In some embodiments, the beam deflecting element 315 may include a polarization non-selective diffractive element with an optical power (or referred to as a polarization non-selective diffractive lens), e.g., a surface relief grating with an optical power, a volume Bragg grating with an optical power, etc. In some embodiments, the beam deflecting element 315 may also include a waveplate (e.g., a quarter-wave plate) coupled with the polarization non-selective diffractive element. The waveplate may be disposed between the polarization non-selective diffractive element and the light guide 110. The waveplate may be configured to convert a circularly polarized beam into a linearly polarized beam, and convert a linearly polarized beam into a circularly polarized beam.

As shown in FIG. 3, when the in-coupled beam 131 is incident onto the out-coupling grating 145, the out-coupling grating 145 may substantially backwardly diffract the RHCP component of the in-coupled beam 131 out of the light guide 110 as the output beam (e.g., RHCP beam) 332 propagating toward the beam deflecting element 315. The out-coupling grating 145 may also slightly forwardly diffract the RHCP component of the in-coupled beam 131 as the leaked beam 337 propagating toward the lens assembly 102. In the embodiment shown in FIG. 3, the output beam 332 may be a reflected diffraction order (which is the desirable diffraction order for illumination), and the leaked beam 337 may be a transmitted diffraction order (which is the undesirable diffraction order resulting in the light leakage). The out-coupling grating 145 may substantially transmit the LHCP component of the in-coupled beam 131, and slightly diffract the LHCP component of the in-coupled beam 131 as a leaked beam (not shown in FIG. 3 as the intensity is significantly less than the leaked beam 337).

In some embodiments, as shown in FIG. 3, the diffraction angles of the output beam 332 and the leaked beam 337 output to opposite sides of the out-coupling element 145 may have substantially the same absolute value and opposite signs. For example, the output beam 332 may have a positive diffraction angle of γ, and the leaked beam 337 may have a negative diffraction angle of (−γ).

The polarization non-selective beam deflecting element 315 may deflect (e.g., forwardly diffract) the output beam (e.g., RHCP beam) 332 as a beam (e.g., an RHCP beam) 334 propagating toward the display panel 120. The display panel 120 may modulate and reflect the beam (e.g., RHCP beam) 334 as an image beam (e.g., an LHCP beam) 336. The polarization non-selective beam deflecting element 315 may deflect (e.g., forwardly diffract) the image beam (e.g., LHCP beam) 336 as an image beam (e.g., an LHCP beam) 338. The image beam 338 may propagate through the light guide 110 toward the out-coupling grating 145. The out-coupling grating 145 may substantially transmit the image beam (e.g., LHCP beam) 338.

In some embodiments, the beam deflecting element 315 may be configured, such that after the output beams 332 is deflected by the beam deflecting element 315 for two times (a first time from the beam 332 to the beam 334 and a second time from the beam 336 to the beam 338), an angular separation between the leaked beam 337 and the image beam 338 may be configured to be greater than or equal to a predetermined angle. Thus, the lens assembly 102 may focus the image beam 338 and the leaked beam 337 to two separate exit pupils at the eye-box region 160. For example, FIG. 3 shows that the lens assembly 102 focuses the image beam 338 as an image beam 340 propagating through the exit pupil 157-3 where the eye pupil 158 is located, and focuses the leaked beam 337 as a leaked beam 339 propagating through the exit pupil 157-2. In such an embodiment, the exit pupil 157-3 may be the output exit pupil, and the exit pupil 157-2 may be the leakage exit pupil. In some embodiments, a distance D2 between the output exit pupil (e.g., 157-3) and the leakage exit pupil (e.g., 157-2) may be greater than or equal to the distance D1 between two neighboring exit pupils 157. Thus, the eye 159 located at the output exit pupil 157-3 may receive the image beam 340 that represents the virtual image generated by the display panel 120, and may not receive the leaked beam 339.

In some embodiments, it may be desirable for the respective chief rays originating from respective portions of the display panel 120 (e.g., A1, A2, A3, A4, etc.) and passing through the center of the aperture stop of the lens assembly 102 (e.g., the center of the lens film of the lens assembly 102) to form respective predetermined angles with the axis 304. In embodiment shown in FIG. 3, the output beams 332 propagating toward the beam deflecting element 315 may be parallel. The optical power of the beam deflecting element 315 may be configured, such that after the respective output beams 332 are reflected by the beam deflecting element 315 for two times, the respective chief rays (included in the respective image beams 338) may form the respective predetermined angles with respect to the axis 304. For example, it may be desirable for the chief ray originating from the portion A1 of the display panel 120 to form a predetermined angle (e.g., 30°) with the axis 304. The beam deflecting element 315 may deflect the output beam 332 having the positive diffraction angle of γ as the beam 334 propagating toward the portion A1 of the display panel 120. The portion A1 of the display panel 120 may reflect the beam 334 as the image beam 336. The beam deflecting element 315 may deflect the image beam 336 as the image beam 338 propagating toward the lens assembly 102. After the output beam 332 is deflected by the beam deflecting element 315 for two times, the chief ray included in the image beam 338 (that is reflected from the portion A1 of the display panel 102) may form the predetermined angle (e.g., 30°) with respect to the axis 304.

In the disclosed embodiments, through the beam deflecting element 315, the image beam 340 and the leaked beam 339 which would otherwise propagate through the same exit pupil in the eye-box region and be received by the eye, may propagate through two separate exit pupils, e.g., the output exit pupil 157-3 and the leakage exit pupil 157-2. Thus, the eye 159 located at the output exit pupil 157-3 may receive the image beam 340 that represents the virtual image generated by the display panel 120, and may not receive the leaked beam 339. In addition, the respective chief rays originating from the respective portions of the display panel 120 may still have the respective predetermined incidence angles at the lens assembly 102, which may be substantially the same as those designed for a conventional system (e.g., the conventional NED 60 shown in FIG. 6) that does not include the beam deflecting element 315. Thus, compared to a conventional system (e.g., the conventional NED 60 shown in FIG. 6) that does not include the beam deflecting element 315, the contrast ratio of the virtual image perceived by the eye 159 in FIG. 3 may be increased.

Figure 4A:
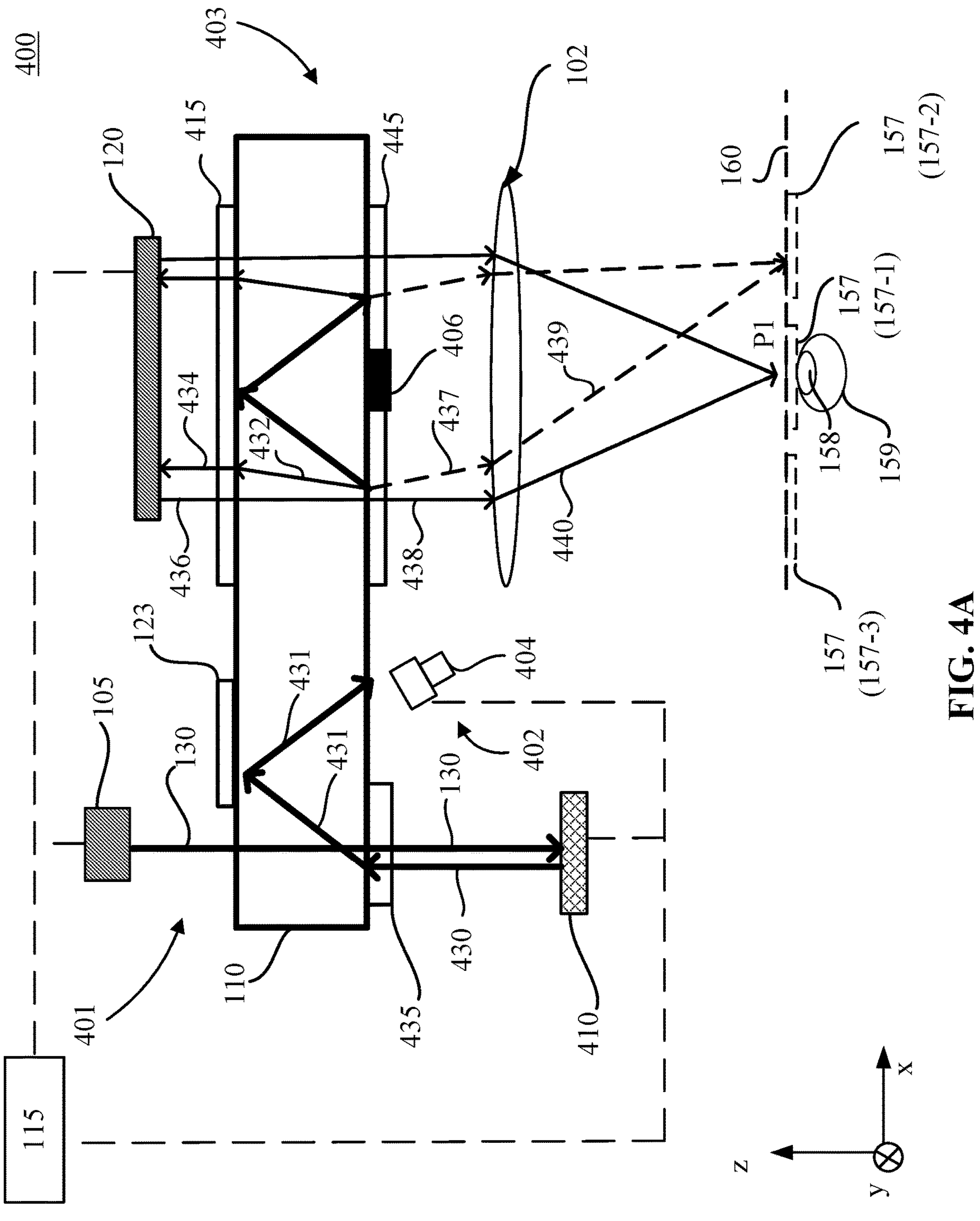
FIGS. 4A and 4B schematically illustrate diagrams of a system configured to provide a pupil steering, according to an embodiment of the present disclosure.

FIG. 4A schematically illustrates an x-y sectional view of a system 400, according to an embodiment of the present disclosure. The system 400 may be a part of a system (e.g., an NED, an HUD, an HMD, a smart phone, a laptop, or a television, etc.) for VR, AR, and/or MR applications. The system 400 may include elements that are similar to or the same as those included in the system 100 shown in FIG. 1A, the system 150 shown in FIG. 1B, the system 180 shown in FIG. 1C, the system 200 shown in FIG. 2A, the system 280 shown in FIG. 2B, or the system 300 shown in FIG. 3. Descriptions of the same or similar elements or features can refer to the above corresponding descriptions, including those rendered in connection with FIG. 1A, FIG. 1B, FIG. 1C, FIG. 2A, FIG. 2B, or FIG. 3.

As shown in FIG. 4A, the system 400 may include a display assembly 401, the viewing optics assembly (also referred to as the lens assembly) 102, an eye tracking system 402, and the controller 115. In some embodiments, the controller 115 may be electrically coupled with, and may control, various devices in the display assembly 401, the viewing optics assembly 102, and the eye tracking system 402. In some embodiments, the display assembly 401, the viewing optics assembly 102, and the eye tracking system 402 may have separate, individual controllers.

The display assembly 401 may include image display components configured to project an image light (forming a computer-generated virtual image) into a display window in a field of view ("FOV"). The eye tracking system 402 may be configured to provide eye-tracking information, based on which a position of the eye pupil 158 of the user may be determined. The viewing optics assembly 102 may be configured to guide the image light output from the display assembly 401 to one of the exit pupils 157 where the eye pupil 158 may be located.

The eye tracking system 402 may include, e.g., one or more light sources 406 configured to illuminate one or both eyes 159 of the user, and one or more optical sensors (e.g., cameras) 404 configured to capture images of one or both eyes 159. The eye tracking system 402 may be configured to track a position, a movement, and/or a viewing direction of the eye pupil 158. In some embodiments, the eye tracking system 402 may measure the eye position and/or eye movement up to six degrees of freedom for each eye 159 (i.e., 3D positions, roll, pitch, and yaw). In some embodiments, the eye tracking system 402 may measure a pupil size. The eye tracking system 402 may provide a signal (or feedback) indicating the position and/or movement of the eye pupil 158 to the controller 115.

In the embodiment shown in FIG. 4A, the display assembly 401 may include the display panel 120 and a light guide illumination assembly 403 configured to output a light (or beam) 434 to the display panel 120 for illuminating the display panel 120. The light guide illumination assembly 403 may include elements that are similar to or the same as those included in the light guide illumination assembly 103 shown in FIG. 1A, the light guide illumination assembly 153 shown in FIG. 1B, the light guide illumination assembly 203 shown in FIG. 2A, the light guide illumination assembly 243 shown in FIG. 2B, or the light guide illumination assembly 303 shown in FIG. 3. Descriptions of the same or similar elements or features can refer to the above corresponding descriptions, including those rendered in connection with FIG. 1A, FIG. 1B, FIG. 2A, FIG. 2B, or FIG. 3. For discussion purposes, the light guide illumination assembly 403 may be similar to the light guide illumination assembly 203 shown in FIG. 2A. For example, the light guide illumination assembly 403 may include the light source assembly 105, and the light guide 110 coupled with an in-coupling element 435 and an out-coupling element 445, and a beam deflecting element 415 disposed between the light guide 110 and the display panel 120.

In the embodiment shown in FIG. 4A, the light guide illumination assembly 403 may also include a steering reflector 410 facing an input portion of the light guide 110. The light source 105 and the steering reflector 410 may be disposed at opposite sides of the light guide 110. The steering reflector 410 may include a micro-mirror, e.g., a micro-electro-mechanical system ("MEMS") mirror. The controller 115 may control the steering reflector 410 to provide different steering angles to an input beam while reflecting the input beam.

In one embodiment, the light source assembly 105 may be configured to output (e.g., emit) a circularly polarized beam 130 having a first handedness, e.g., an LHCP beam, toward the in-coupling element 435. The in-coupling element 435 may include a reflective PVH grating configured to substantially transmit a circularly polarized beam having the first handedness (e.g., an LHCP beam), and substantially diffract a circularly polarized beam having a second handedness that is opposite to the first handedness (e.g., an RHCP beam). Thus, the in-coupling element 435 may transmit the circularly polarized beam 130 toward the steering reflector 410. The steering reflector 410 may reflect the circularly polarized beam (e.g., LHCP beam) 130 as a circularly polarized beam (e.g., RHCP beam) 430 toward the in-coupling element 435. The in-coupling element 435 may couple, via diffraction, the circularly polarized beam (e.g., RHCP beam) 430 into the light guide 110 as an in-coupled beam 431. When output from the in-coupling element 435, the in-coupled beam 431 may be an RHCP beam. The in-coupled beam (e.g., RHCP beam) 431 may be incident onto the retardation film 123 (e.g., an A-plate), and may be converted into a substantially linearly or elliptically polarized beam, as the in-coupled beam 431 propagates inside the light guide 110 toward the out-coupling element 445.

The out-coupling element 445 may include a reflective PVH grating configured to substantially diffract a circularly polarized beam having the second handedness (e.g., an RHCP beam), and substantially transmit a circularly polarized beam having the first handedness (e.g., an LHCP beam). Thus, the out-coupling element 445 may substantially backwardly diffract the RHCP component of the in-coupled beam 431 out of the light guide 110 as a plurality of output beam (e.g., RHCP beams) 432 propagating through the light guide 110 toward the beam deflecting element 415. The out-coupling grating 445 may slightly forwardly diffract the RHCP component of the in-coupled beam 431 as a plurality of leaked beams 437 out of the light guide 110 toward the lens assembly 102. The out-coupling grating 445 may substantially transmit the LHCP component of the in-coupled beam 431, and slightly diffract the LHCP component of the in-coupled beam 431 as a leaked beam (not shown in FIG. 4A as the intensity is significantly less than the leaked beam 437).

The beam deflecting element 415 may be configured to transmit a circularly polarized beam having the first handedness (e.g., an LHCP beam), and deflect a circularly polarized beam having the second handedness (e.g., an RHCP beam). Thus, the beam deflecting element 415 may deflect (e.g., forwardly diffract) the output beams (e.g., RHCP beams) 432 as the beams (e.g., RHCP beams) 434 propagating toward the display panel 120. The display panel 120 may modulate and reflect the beams (e.g., RHCP beam) 434 as image beams (e.g., LHCP beams) 436. The beam deflecting element 415 may substantially transmit the image beams 436 toward the light guide 110 and the out-coupling grating 445. The out-coupling grating 445 may substantially transmit the image beams (e.g., LHCP beams) 436 as image beams 438 toward the lens assembly 102. The beam deflecting element 415 may be configured, such that an angular separation between the image beam 438 (or the image beam 436) and the corresponding leaked beam 437 may be greater than or equal to a predetermined angle. Thus, the lens assembly 102 may focus the image beams 438 and the leaked beams 437 to two separate exit pupils 157-1 and 157-2 (e.g., an output exit pupil and a leakage exit pupil) at the eye-box region 160. Thus, the contrast ratio of the virtual image perceived by the eye 159 at the output exit pupil may be increased.

Figure 4B:
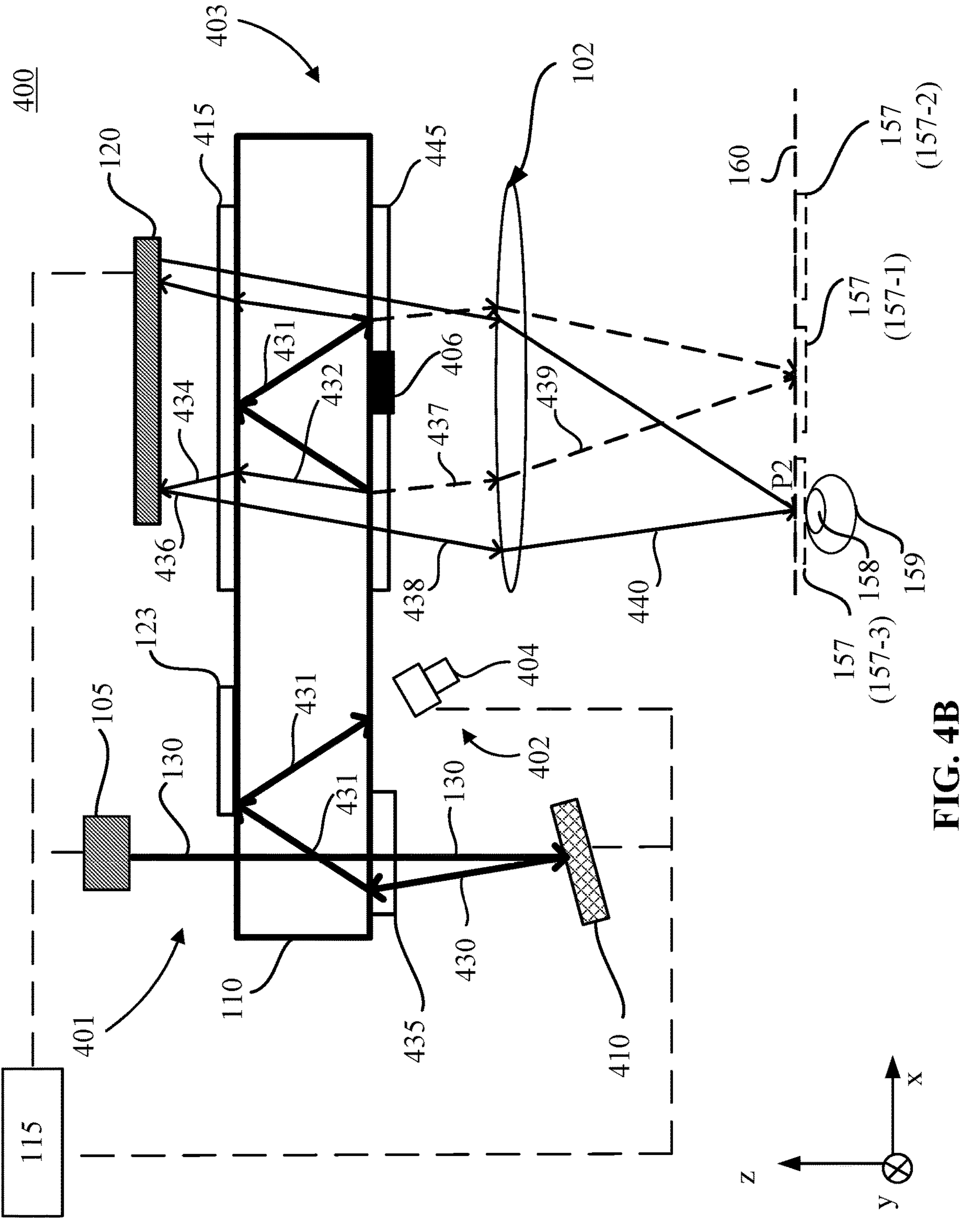

In some embodiments, based on the eye tracking information from the eye tracking system 402, the controller 115 may be configured to control the steering reflector 410 to operate in different steering states to steer the beam 130 by different angles, thereby varying the incidence angle of the beam 430, or a chief ray of the beam 430, at the in-coupling element 435. The incidence angle of the beam 430, or a chief ray of the beam 430, at the in-coupling element 435 may determine the position of the output exit pupil in the eye-box region 160. For illustrative purposes, FIGS. 4A and 4B show two steering states of the steering reflector 410. As shown in FIG. 4A, at a first time instance or period, the eye tracking system 402 may detect that the eye pupil 158 is located at a first position P1 within the eye-box region 160. Based on the eye-tracking information, the controller 115 may control the steering reflector 410 to operate at (e.g., be switched to) a first steering state. The beam 430 steered by the steering reflector 410 operating at the first steering state may have a first incidence angle at the in-coupling element 435 (in this case, zero degree since the beam 430 is normally incident onto the in-coupling element 435). The lens assembly 102 may focus the image beams 438 to the exit pupil 157-1 that may substantially coincide with the first position P1 of the eye pupil 158. The lens assembly 102 may also focus the leaked beams 437 to the exit pupil 157-2. In such a case, the exit pupil 157-1 may be the output exit pupil, and the exit pupil 157-2 may be the leakage exit pupil.

At a second time instance or period, as shown in FIG. 4B, the eye tracking system 402 may detect that the eye pupil 158 has moved to a second position P2 at the eye-box region 160. The eye tracking system 402 may provide the new position information (as part of the eye tracking information) to the controller 115. Alternatively, in some embodiments, the controller 115 may determine the new eye tracking information based on images of the eye pupil 158 received from the eye tracking system 402. The controller 115 may control the steering reflector 410 to switch to a second steering state different from the first steering state. Thus, the beam 430 steered by the steering reflector 410 operating at the second steering state may have a second, different incidence angle at the in-coupling element 435. The lens assembly 102 may focus the image beams 438 to the exit pupil 157-3 that may substantially coincide with the second position P2 of the eye pupil 158. The lens assembly 102 may also focus the leakage beams 437 to the exit pupil 157-1. In this situation, the exit pupil 157-3 may be the output exit pupil, and the exit pupil 157-1 may be the leakage exit pupil.

In FIG. 1A-FIG. 4B, exemplary light guide illumination assemblies for providing an increased contrast ratio are illustrated and described. For illustrative purposes, various light guide illumination assemblies for one-dimensional ("1D") illumination and contrast ratio increase (e.g., in an x-axis direction) are used as examples to explain the principle of the disclosed systems and methods for increasing the contrast ratio. In some embodiments, two-dimensional (2D") illumination and contrast ratio increase (e.g., in both x-axis direction and y-axis direction) may be achieved by introducing an additional diffractive optical element (e.g., a folding or redirecting element). In some embodiments, the out-coupling elements shown in the FIG. 1A-FIG. 4B may include the folding function, and a separate redirecting element may not be needed. Thus, although 1D illumination and contrast ratio increase (e.g., in an x-axis direction) are used to explain the principle of the embodiments shown in FIGS. 1A-4B, the light guide illumination assemblies included in FIG. 1A-FIG. 4B can provide 2D illumination and contrast ratio increase. For illustrative purposes, the out-coupling elements shown in the FIGS. 2A-4B include reflective out-coupling gratings, and the illumination beams and leaked beams output from the reflective out-coupling grating are used as examples to explain the principle of directing the illumination beams and leaked beams to different exit pupils. In some embodiments, the out-coupling elements may include transmissive out-coupling gratings.

The light guide illumination assemblies or systems disclosed herein may include or be implemented in conjunction with an artificial reality system. Artificial reality is a form of reality that has been adjusted in some manner before being presented to a user, which may include, e.g., a virtual reality ("VR"), an augmented reality ("AR"), a mixed reality ("MR"), or some combination and/or derivatives thereof. Artificial reality content may include computer-generated content, or a mixture of computer-generated content and content captured from the real-world environment. The artificial reality content may include video, audio, haptic feedback, or some combination thereof, and any of which may be presented in a single channel or in multiple channels (such as stereo video that produces a three-dimensional effect) to the user. Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display ("HMD") connected to a host computer system, a standalone HMD, a mobile device or computing system, or any other hardware platform capable of providing artificial reality content to one or more viewers.

Figure 5A:
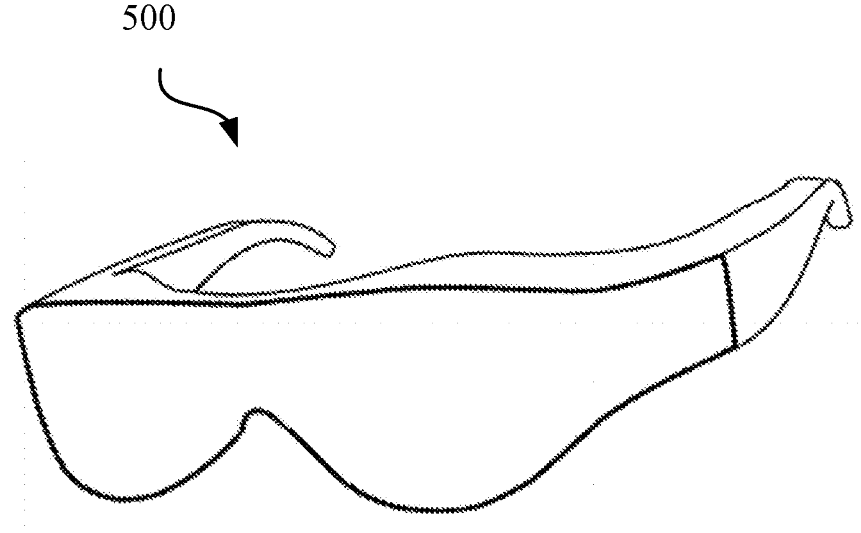
FIG. 5A schematically illustrates a diagram of a near-eye display ("NED"), according to an embodiment of the present disclosure.

FIG. 5A illustrates a schematic diagram of a system 500, according to an embodiment of the present disclosure. The system 500 may be an optical system configured for AR, MR, and/or VR applications. In some embodiments, the system 500 may be configured to be worn on a head of a user (e.g., by having the form of spectacles or eyeglasses, as shown in FIG. 5A), or to be included as part of a helmet that is worn by the user. In some embodiments, the system 500 may be referred to as a head-mounted display. In some embodiments, the system 500 may be configured for placement in proximity to an eye or eyes of the user at a distance in front of the eye(s), without being mounted to the head of the user. For example, the system 500 may be mounted in a vehicle, such as a car or an airplane, at a distance in front of an eye or eyes of the user.

Figure 5B:
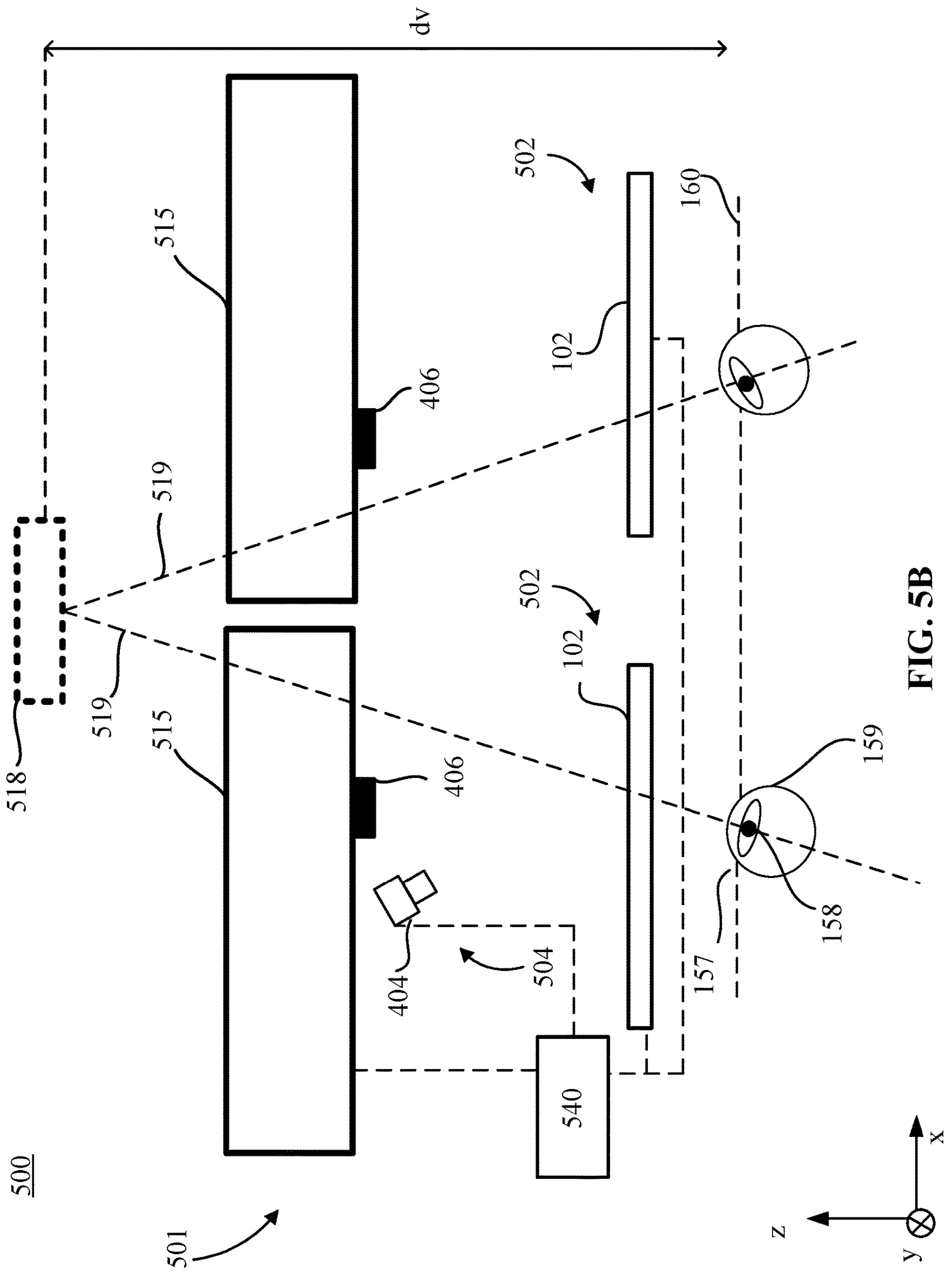
FIG. 5B illustrates a schematic cross-sectional view of the NED shown in FIG. 5A, according to an embodiment of the present disclosure.

FIG. 5B schematically illustrates an x-y sectional view of the system 500 shown in FIG. 5A, according to an embodiment of the present disclosure. The system 500 may include a display assembly 501, a viewing optics assembly 502 for each eye, an object tracking system 504, and the controller 540. The object tracking system 504 may be an eye tracking system and/or face tracking system. The object tracking system 504 may include one or more IR light sources 406 configured to emit an IR light to illuminate the eyes 159 and/or the face. The object tracking system 504 may also include one or more optical sensors 404, such as one or more cameras, configured to receive the IR light reflected by each eye 159 and generate a tracking signal relating to the eye 159, such as an image of the eye 159 based on the received IR light. In some embodiments, the object tracking system 504 may also include an IR deflecting element (not shown) configured to deflect the IR light reflected by the eye 159 toward the one or more optical sensors 404.

The controller 540 may be communicatively coupled with the display assembly 501, the viewing optics assembly 502, and/or the object tracking system 504 to control the operations thereof. The controller 540 may include a processor or processing unit. The processor may be any suitable processor, such as a central processing unit ("CPU"), a graphic processing unit ("GPU"), etc. The controller 540 may include a storage device. The storage device may be a non-transitory computer-readable medium, such as a memory, a hard disk, etc. The storage device may be configured to store data or information, including computer-executable program instructions or codes, which may be executed by the processor to perform various controls or functions described in the methods or processes disclosed herein. The storage device may also store images, including virtual images and/or real world images, such as the images of the eyes/face captured by the optical sensors 404.

The display assembly 501 may display virtual images to a user. In some embodiments, the display assembly 501 may include a single electronic display or multiple electronic displays 515. For discussion purposes, FIG. 5B shows two electronic displays 515. The electronic display 515 may include a display element (e.g., a reflective display panel) and a light guide illumination assembly for illuminating the display element. The light guide illumination assembly may be an embodiment of the light guide illumination assemblies disclosed herein, such as the light guide illumination assembly 103 shown in FIG. 1A, the light guide illumination assembly 153 shown in FIG. 1B, the light guide illumination assembly 203 shown in FIG. 2A, the light guide illumination assembly 243 shown in FIG. 2B, the light guide illumination assembly 303 shown in FIG. 3, or the light guide illumination assembly 403 shown in FIGS. 4A and 4B.

Each viewing optics assembly 502 may be arranged between the display assembly 501 and the eyes 159, and may be configured to guide an image beam representing a virtual image generated by the display assembly 501 and a leaked beam to two separate exit pupils 157 for each eye 159 at the eye-box region 160, as illustrated in other figures and described above. The two separate exit pupils 157 may be referred to as an output exit pupil through which the image beam propagates, and a leakage exit pupil through which the leaked beam propagates. For example, the viewing optics assembly 502 may include one or more optical elements configured to correct aberrations in an image light output from the display assembly 501, focus an image light output from the display assembly 501, or perform another type of optical adjustment of an image light output from the display assembly 501. Examples of the one or more optical elements may include a Fresnel lens, a folded lens assembly for increasing a length of the optical path from the electronic display 515 to the eye 159, an aperture, a filter, or any other suitable optical elements. For discussion purpose, FIG. 5B shows that the viewing optics assembly 502 may include a lens assembly 102 for each eye 159.

In some embodiments, the lens assembly 102 may be configured with an adjustable optical power to address an accommodation-vergence conflict in the system 500. For example, the lens assembly 102 may be configured with a large aperture size, such as 50 mm, for a large field of view, such as 65 degrees with 20 mm eye relief distance, a large optical power for adapting human eye vergence accommodation, such as ±2.0 Diopters, a fast switching speed at the milli-seconds level or tens of milliseconds level for adapting vergence-accommodation of human eyes, and a high image quality for meeting human eye acuity.

For example, each electronic display 515 may display a virtual image or a portion of the virtual image. Based on the eye tracking information provided by the object tracking system 504, the controller 540 may determine a virtual object 518 within the virtual image at which the eyes 159 are currently looking. The controller 540 may determine a vergence depth (dv) of the gaze of the user based on the gaze point or an estimated intersection of gaze lines 519 determined by the object tracking system 504. As shown in FIG. 5B, the gaze lines 519 may converge or intersect at the distance dv, where the virtual object 518 is located. The controller 540 may control the lens assemblies 102 to adjust the optical power to provide an accommodation that matches the vergence depth (dv) associated with the virtual object 518 at which the eyes 159 are currently looking, thereby reducing the accommodation-vergence conflict in the system 500. For example, the controller 540 may control each lens assembly 102 to provide a desirable optical power corresponding to a focal plane or an image plane that matches with the vergence depth (dv). In some embodiments, based on the eye tracking information from the object tracking system 504, the controller 115 may be configured to control the display assembly 501 (and the viewing optics assembly 502) to steer the image beam to the output exit pupil that substantially coincides with the position of the eye pupil 158, and steer the leaked beam (not shown) to a leaked exit pupil that is located outside of the eye pupil 158.

In some embodiments, the present discourse provides a device. The device includes a light source configured to output a first beam. The device also includes a light guide coupled with an in-coupling element and an out-coupling element. The device also includes a display panel and a lens assembly disposed at opposite sides of the light guide. The in-coupling element is configured to couple the first beam into the light guide as a second beam. The out-coupling element is configured to couple a first portion of the second beam out of the light guide as a third beam propagating toward the display panel to illuminate the display panel, and couple a second portion of the second beam out of the light guide as a fourth beam propagating toward the lens assembly. A normal of a surface of the light guide where the out-coupling element is disposed is tilted by a predetermined angle with respect to an axis of the display panel. In some embodiments, the predetermined angle is within a range of 5° to 10°.

In some embodiments, the axis of the display panel is an axis of symmetry of the display panel extending along a thickness direction of the display panel. In some embodiments, the axis of symmetry of the display panel is parallel with an optical axis of the lens assembly. In some embodiments, the surface of the light guide where the out-coupling element is disposed is a first surface, and the light guide includes a second surface that is opposite to and parallel with the first surface. In some embodiments, the surface of the light guide where the out-coupling element is disposed is a first surface, and the light guide includes a second surface that is opposite to the first surface, a surface normal of the second surface is parallel to the axis of the display panel. In some embodiments, the display panel is configured to modulate and reflect the third beam as a fifth beam propagating toward the light guide and the lens assembly, and the lens assembly is configured to focus the fifth beam to propagate through an exit pupil within an eye-box region of the device, a position of the exit pupil substantially coinciding with a position of an eye pupil of a user of the device. In some embodiments, the lens assembly is configured to focus the fourth beam to propagate through a spatial location that is within the eye-box region and outside of the exit pupil. In some embodiments, propagation directions of the first beam and the third beam are parallel. In some embodiments, a propagation direction of the fourth beam forms an angle with respect to the axis of the display panel, the angle is two times of the predetermined angle.

In some embodiments, the present discourse provides a device. The device includes a light source configured to output a first beam. The device also includes a light guide coupled with an in-coupling element and an out-coupling element. The device also includes a display panel and a lens assembly disposed at opposite sides of the light guide. The device also includes a beam deflecting element disposed between the light guide and the display panel. The in-coupling element is configured to couple the first beam into the light guide as a second beam. The out-coupling element is configured to couple a first portion of the second beam out of the light guide as a third beam propagating toward the beam deflecting element, and couple a second portion of the second beam out of the light guide as a fourth beam propagating toward the lens assembly. The beam deflecting element is configured to forwardly deflect the third beam as a fifth beam propagating toward the display panel to illuminate the display panel. In some embodiments, the display panel is configured to modulate and reflect the fifth beam as a sixth beam propagating toward the light guide and the lens assembly. The lens assembly is configured to focus the sixth beam to propagate through an exit pupil within an eye-box region of the device, a position of the exit pupil substantially coinciding with a position of an eye pupil of a user of the device.

In some embodiments, the lens assembly is configured to focus the fourth beam to propagate through a spatial location that is within the eye-box region and outside of the exit pupil. In some embodiments, the beam deflecting element is a polarization selective beam deflecting element configured to forwardly deflect the third beam as the fifth beam propagating toward the display panel to illuminate the display panel, and transmit the sixth beam reflected from the display panel while maintaining a propagation direction of the sixth beam. In some embodiments, the beam deflecting element is a polarization non-selective beam deflecting element configured to forwardly deflect the third beam as the fifth beam propagating toward the display panel to illuminate the display panel, and forwardly deflect the sixth beam reflected from the display panel toward the lens assembly.

In some embodiments, output angles of the third beam and the fourth beam out-coupled from the light guide have substantially the same absolute value and opposite signs. In some embodiments, the beam deflecting element is configured to forwardly deflect the third beam as the fifth beam having a propagation direction that is parallel to a propagation direction of the first beam. In some embodiments, the beam deflecting element is configured with an optical power. In some embodiments, the out-coupling element is configured to couple the second beam incident onto different portions of the out-coupling element out of the light guide as a plurality of third beams propagating toward the beam deflecting element; and the beam deflecting element is configured to forwardly deflect respective third beams by different predetermined angles.

Further, when an embodiment illustrated in a drawing shows a single element, it is understood that the embodiment or an embodiment not shown in the figures but within the scope of the present disclosure may include a plurality of such elements. Likewise, when an embodiment illustrated in a drawing shows a plurality of such elements, it is understood that the embodiment or an embodiment not shown in the figures but within the scope of the present disclosure may include only one such element. The number of elements illustrated in the drawing is for illustration purposes only, and should not be construed as limiting the scope of the embodiment. Moreover, unless otherwise noted, the embodiments shown in the drawings are not mutually exclusive, and they may be combined in any suitable manner. For example, elements shown in one figure/embodiment but not shown in another figure/embodiment may nevertheless be included in the other figure/embodiment. In any optical device disclosed herein including one or more optical layers, films, plates, or elements, the numbers of the layers, films, plates, or elements shown in the figures are for illustrative purposes only. In other embodiments not shown in the figures, which are still within the scope of the present disclosure, the same or different layers, films, plates, or elements shown in the same or different figures/embodiments may be combined or repeated in various manners to form a stack.

Various embodiments have been described to illustrate the exemplary implementations. Based on the disclosed embodiments, a person having ordinary skills in the art may make various other changes, modifications, rearrangements, and substitutions without departing from the scope of the present disclosure. Thus, while the present disclosure has been described in detail with reference to the above embodiments, the present disclosure is not limited to the above described embodiments. The present disclosure may be embodied in other equivalent forms without departing from the scope of the present disclosure. The scope of the present disclosure is defined in the appended claims.

What is claimed is:

1. A device, comprising:

a light source configured to output a first beam;

a light guide coupled with an in-coupling element and an out-coupling element, the in-coupling element and the out-coupling element disposed on a first outer surface of the light guide;

a retardation film disposed on a second outer surface of the light guide at a location that is longitudinally between the in-coupling element and the out-coupling element, the second outer surface being opposite the first outer surface; and a display panel and a lens assembly disposed at opposite sides of the light guide, wherein the in-coupling element is configured to couple the first beam into the light guide as a second beam, wherein the out-coupling element is configured to couple a first portion of the second beam out of the light guide as a third beam propagating toward the display panel to illuminate the display panel, and couple a second portion of the second beam out of the light guide as a fourth beam propagating toward the lens assembly, and wherein a normal of a surface of the light guide where the out-coupling element is disposed is tilted by a predetermined angle with respect to an axis of the display panel.

2. The device of claim 1, wherein the predetermined angle is within a range of 5° to 10°.

3. The device of claim 1, wherein the axis of the display panel is an axis of symmetry of the display panel extending along a thickness direction of the display panel.

4. The device of claim 3, wherein the axis of symmetry of the display panel is parallel with an optical axis of the lens assembly.

5. The device of claim 1, wherein the surface of the light guide where the out-coupling element is disposed is a first surface, and the light guide includes a second surface that is opposite to and parallel with the first surface.

6. The device of claim 1, wherein the display panel is configured to modulate and reflect the third beam as a fifth beam propagating through the light guide toward the lens assembly, and wherein the lens assembly is configured to focus the fifth beam to propagate through an exit pupil within an eye-box region of the device, a position of the exit pupil substantially coinciding with a position of an eye pupil of a user of the device.

7. The device of claim 6, wherein the lens assembly is configured to focus the fourth beam to propagate through a spatial location that is within the eye-box region and outside of the exit pupil.

8. The device of claim 1, wherein propagation directions of the first beam and the third beam are parallel.

9. The device of claim 8, wherein a propagation direction of the fourth beam forms an angle with respect to the axis of the display panel, the angle is two times of the predetermined angle.

* * * * *